United States Patent
Contreras et al.

(10) Patent No.: US 12,347,472 B1
(45) Date of Patent: Jul. 1, 2025

(54) POSITIVE LASER BIAS ELECTRICAL CONTROL ARCHITECTURE FOR DARK LASER HEATING IN HEAT ASSISTED MAGNETIC RECORDING

(71) Applicant: Western Digital Technologies, Inc., San Jose, CA (US)

(72) Inventors: John T. Contreras, Palo Alto, CA (US); Joey M. Poss, Rochester, MN (US)

(73) Assignee: Western Digital Technologies, Inc., San Jose, CA (US)

(*) Notice: Subject to any disclaimer, the term of this patent is extended or adjusted under 35 U.S.C. 154(b) by 19 days.

(21) Appl. No.: 18/402,926

(22) Filed: Jan. 3, 2024

(51) Int. Cl.
  *G11B 5/02* (2006.01)
  *G11B 5/012* (2006.01)
  *G11B 7/1267* (2012.01)
  *G11B 13/08* (2006.01)
  *G11B 5/00* (2006.01)

(52) U.S. Cl.
  CPC ............ *G11B 7/1267* (2013.01); *G11B 5/012* (2013.01); *G11B 13/08* (2013.01); *G11B 2005/0021* (2013.01)

(58) Field of Classification Search
  CPC ... G11B 5/02; G11B 27/36; G11B 2005/0021; G11B 5/09
  USPC .......................................................... 360/59
  See application file for complete search history.

(56) References Cited

U.S. PATENT DOCUMENTS

| | | |
|---|---|---|
| 9,123,355 B1 | 9/2015 | Dakroub et al. |
| 9,281,659 B1* | 3/2016 | Tatah ............... H01S 5/0651 |
| 9,916,850 B1 | 3/2018 | Chu et al. |
| 9,916,851 B1 | 3/2018 | Seigler et al. |
| 10,540,998 B2 | 1/2020 | Tatah et al. |
| 10,580,446 B1 | 3/2020 | Wessel |
| 2014/0301173 A1 | 10/2014 | Kuehlwein |

OTHER PUBLICATIONS

Sakoguchi et al., Mode hopping impact on NFT protrusion measurement in HAMR, Jul. 10, 2023, Published in: IEEE Transactions on Magnetics, Retrieved from https://ieeexplore.ieee.org/document/10177246.

* cited by examiner

*Primary Examiner* — Nabil Z Hindi
(74) *Attorney, Agent, or Firm* — NOD Law PC

(57) ABSTRACT

Various illustrative aspects are directed to a data storage device comprising a disk, a read/write head configured to read data from and write data to the disk, a laser diode (LD) coupled to a near field transducer (NFT) configured to heat an area of the disk near the read/write head, an asymmetric LD driver configured to drive the LD, and one or more processing devices configured to: preheat the LD to a target temperature, wherein the preheating comprises: generating at least one bias pulse conforming to one or more tunable parameters, based at least in part on the target temperature; and applying, using the asymmetric LD driver, the at least one bias pulse to the LD such that no optical response is produced by the LD; and initiate a write operation for writing data to the disk.

22 Claims, 18 Drawing Sheets

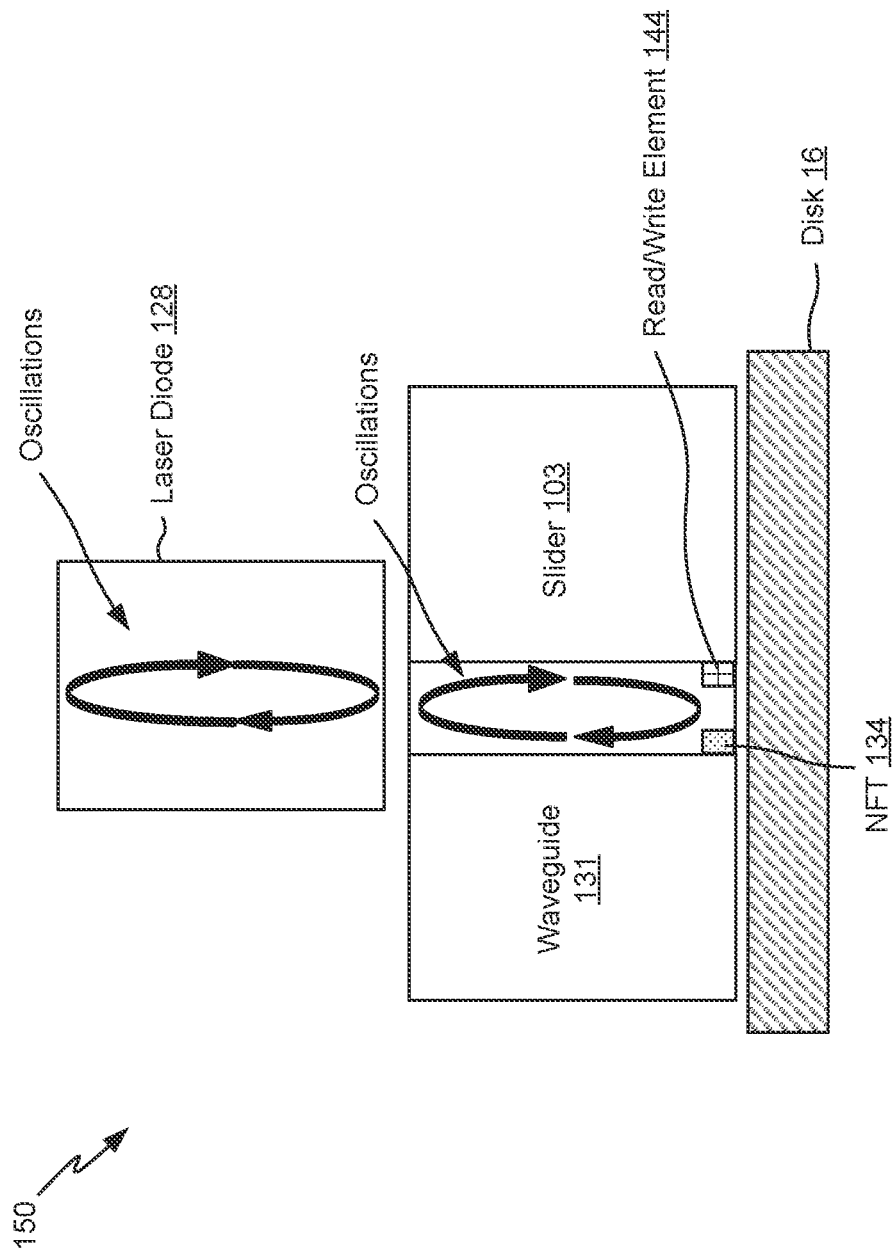

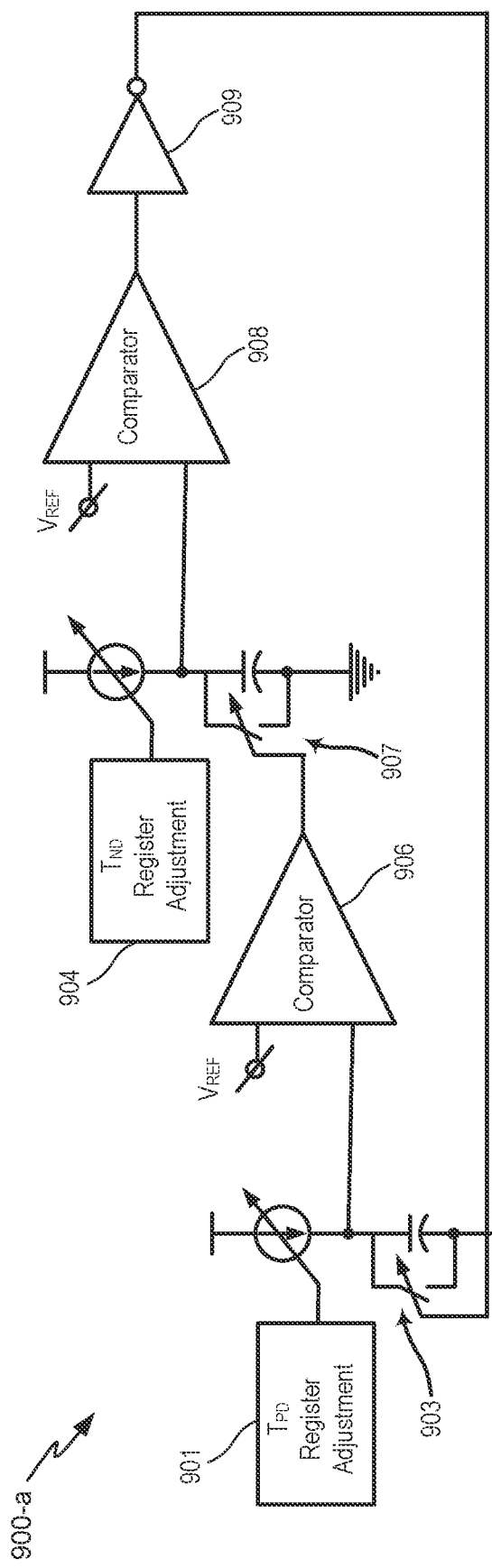
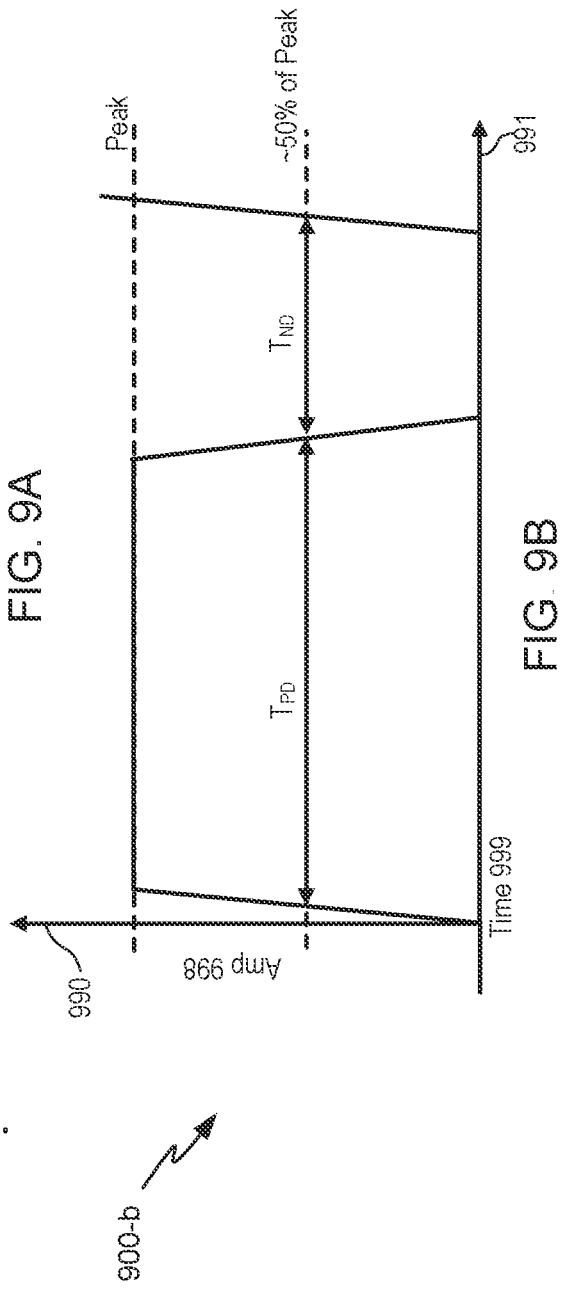
FIG. 9A
FIG. 9B

POSITIVE LASER BIAS ELECTRICAL CONTROL ARCHITECTURE FOR DARK LASER HEATING IN HEAT ASSISTED MAGNETIC RECORDING

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1A is a conceptual diagram of a prior art disk format 2 comprising a number of radially-spaced, concentric servo tracks 4 defined by servo wedges 6O-6N recorded around the circumference of each servo track. A plurality of concentric data tracks are defined relative to servo tracks 4, wherein the data tracks may have the same or a different radial density (e.g., tracks per inch (TPI)) than servo tracks 6. Each servo wedge 6; comprises a preamble 8 for storing a periodic pattern, which allows proper gain adjustment and timing synchronization of the read signal, and a synchronization mark 10 (sync mark 10) for storing a special pattern used to symbol synchronize to a servo data field 12. Servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head positioning information is processed to position a head over a target data track during a seek operation, and servo bursts 14 provide fine head position information used for centerline tracking while accessing a data track during write/read operations. A position error signal (PES) is generated by reading servo bursts 14, wherein the PES represents a measured position of the head relative to a centerline of a target servo track. A servo controller processes the PES to generate a control signal applied to one or more actuators to actuate the head radially over the disk in a direction that reduces the PES.

The description provided in this background section should not be assumed to be prior art merely because it is mentioned in or associated with this background section. The background section may include information that describes one or more aspects of the subject technology.

SUMMARY

The following summary relates to one or more aspects and/or embodiments disclosed herein. It should not be considered an extensive overview relating to all contemplated aspects and/or embodiments, nor should it be regarded to identify key or critical elements relating to all contemplated aspects and/or embodiments or to delineate the scope associated with any particular aspect and/or embodiment. Accordingly, the following summary has the sole purpose of presenting certain concepts relating to one or more aspects and/or embodiments relating to the mechanisms disclosed herein in a simplified form to precede the detailed description presented below.

Some disk drives employ heat-assisted magnetic recording (HAMR) by using a laser diode (LD) to briefly reduce the coercivity of the disk's magnetic material, which allows for denser data writing. In some cases, however, LDs in HAMR drives are susceptible to temperature-induced mode hopping, for instance, during the start of a write operation, seeking between tracks, servo sector or servo wedge crossings, etc. For example, during HAMR write, the temperature of an LD may increase (e.g., by 10-20 degrees C.), and several mode hop critical temperatures may be crossed during this temperature transient. In some circumstances, one or more mode hop events may be triggered during this transient phase, which may adversely impact write performance. In some instances, mode hop events during a HAMR write operation may result in recording non-uniformities, which degrades HAMR recording performance.

Thus, HAMR drives face the issue of "mode hopping," where temperature changes in the LD cause it to switch between different lasing modes, leading to variations in output power and wavelength. This can cause inconsistent heating applied to the media, compromise the reliability of data recording, and reduce heating effectiveness if the new wavelength mismatches the HAMR head's settled wavelength after switching to write mode. Hence, effective temperature management of the laser diode is crucial for reliable HAMR data writing operation.

A technique referred to as dark laser heating "DLH" may be employed to preheat a LD to a target or steady state temperature prior to a write operation. In such cases, the LD consumes power and generates heat without significantly emitting photons, the particles responsible for light emission. Some techniques implement DLH by driving the LD using a reverse bias voltage level that is at or near the reverse break-down voltage, where the laser conducts current but does not emit light. By operating in this break-down voltage region, the LD predominantly performs as a traditional diode, converting the electrical power it receives into heat instead of light. This allows the LD to warm up to a specific temperature without substantial light emission, hence the term "dark" laser heating. In other DLH techniques, the LD may be preheated via application of this reverse bias (e.g., at or near the reverse or avalanche breakdown voltage) to the LD. However, DLH using a reverse bias often requires a large negative bias voltage (e.g., below −15 volts, −17 volts, −20 volts, to name a few non-limiting examples) which may require hardware modifications, such as high-voltage integrated circuits (ICs) to buffer and control the reverse bias applied to the LD.

Broadly, aspects of the present disclosure are directed to preheating an LD to a target temperature (e.g., steady state temperature associated with a write operation) using a novel DLH technique, as further described below.

In accordance with aspects of the present disclosure, a laser diode driver (e.g., an asymmetric BiCMOS driver) can be used to preheat the LD to a target temperature associated with a write operation by driving the LD using bias pulses, herein referred to as DLH-pulse bias. In some cases, the LD driver may be a programmable LD driver that is configured to generate the bias pulses for driving the LD, based on one or more programmable features or parameters, further described below in relation to FIGS. 5A through 6B. Some non-limiting examples of the programmable features/parameters of the disclosed LD driver architecture may include one or more amplitude parameters (e.g., LD bias above lasing threshold current, $I_P$; LD bias below lasing threshold current, $I_N$), one or more overshoot parameters (e.g., positive overshoot compensation, $OSA_P$; negative overshoot compensation, $OSA_N$), one or more timing parameters (e.g., LD positive duration, $T_{PD}$; LD negative duration, $T_{ND}$; overshoot positive duration, $T_{OPD}$; overshoot negative duration, $T_{OND}$), and one or more termination parameters (e.g., programmable termination, $R_T$). The programmable termination, $R_T$, may refer to a resistive termination across the nodes of the LD driver circuit and may be utilized for impedance matching to the transmission line.

In some examples, each of the bias pulses generated by the LD driver (e.g., LD driver 500-b in FIG. 5B) may comprise a current pulse having a first portion and a second portion, where the first portion corresponds to a LD bias current that is above a lasing threshold current, while the second portion correspond to a LD bias current that is below the lasing threshold current. In some cases, no optical response is produced by the LD when the LD bias current is below the lasing threshold current. Furthermore, an optical response is produced by the LD when the LD bias current is above the lasing threshold current and is applied for a sufficient duration (e.g., longer than the turn-on delay ($\tau$) of the LD). In some cases, one or more of the programmable features/parameters may be used to calibrate the first portion (also referred to as positive portion) in each current cycle, where each current cycle includes a positive pulse/portion and a negative pulse/portion. For example, one or more of the peak laser current ($I_P$), positive overshoot compensation ($OSA_P$), LD positive duration ($T_{PD}$), and overshoot positive duration ($T_{OPD}$) may be used to calibrate the positive pulse or portion in each current cycle. Similarly, one or more of the programmable features/parameters may be used to calibrate the second portion (also referred to as negative portion) in each current cycle. For instance, one or more of the negative peak laser current ($I_N$), negative overshoot compensation ($OSA_N$), LD negative duration ($T_{ND}$), and overshoot negative duration ($T_{OND}$) may be used to calibrate the negative portion in each current cycle. In some cases, $I_P > I_{TH} > I_N$, where $I_{TH}$ is the lasing threshold current. It should be noted that, in some embodiments, $I_N$ may not be negative. Instead, the magnitude of current $I_N$ may be greater than 0, but less than the lasing threshold current ($I_{TH}$). In some embodiments, the LD positive duration ($T_{PD}$) may be longer than the overshoot positive duration ($T_{OPD}$), but shorter than the turn-on delay for the LD, which prevents the LD from producing an optical output. Furthermore, the LD negative duration ($T_{ND}$) may be longer than the overshoot negative duration ($T_{OND}$), but shorter than the LD positive duration ($T_{PD}$). As used herein, the term "current cycle" refers to a periodic current waveform (e.g., resembling a pulse width modulated or PWM signal) having a plurality of pulses, including at least a first pulse (e.g., a positive pulse) and a second pulse (e.g., a negative pulse). FIG. 6A depicts one non-limiting example of the positive (636) and negative pulses (637) of a plurality of current cycles, according to various aspects of the disclosure.

In some embodiments, the dark laser heating (DLH) pulse bias techniques described herein may include preheating the LD (or LD cavity) using a plurality of "positive" bias pulses, where each positive bias pulse is adjacent two "negative" bias pulses. In one non-limiting example, each of the positive bias pulses may be a "short interval" forward bias pulse, where a short interval forward bias pulse may refer to a pulse that has a duration less than a turn-on delay time (or lasing threshold duration). In some embodiments, the lasing threshold duration may be 5 ns, 3 ns, or 2 ns, to name a few. It should be noted that other threshold durations are contemplated in different embodiments and the example values listed herein are not intended to be limiting. For example, in some cases, the turn-on delay threshold duration may be 10 ns, or even 1 ns. In some other cases, the duration or period of each current cycle (i.e., comprising a positive pulse and a negative pulse) may be shorter than the turn-on delay time for the LD. In either case, by controlling the duration of the positive portion of each current cycle such that it is less than the turn-on delay time for the LD allows preheating the LD to the target temperature, while preventing an optical output from the LD.

In some cases, the optical turn-on delay time ($\tau$) of the LD is based at least in part on the lasing threshold current ($I_{TH}$), pulse bias current ($I_{Pulse}$) supplied to the LD, and/or the average carrier lifetime ($\tau_S$). The average carrier lifetime ($\tau_S$), also referred to as the recombination time, is an inherent property of the LD. As known in the art, emission of light from a laser diode, a LED, etc., is based at least in part on the recombination of electrons and holes. Furthermore, preheating the LD using forward bias pulses that have a duration less than a turn-on delay threshold (e.g., <3 nanoseconds (ns)) may serve to prevent an optical response from the LD, which in turn can help minimize or reduce the risk of data erasure/degradation.

In some cases, the bias level of the "positive" pulses in each current cycle may be at or above a lasing threshold (i.e., sufficient to causing lasing or produce an optical output from the LD). However, the duration of each of these positive pulses may be less than the turn-on delay time for the LD. The turn-on delay time for a LD may refer to the duration between when a bias current (i.e., above a lasing threshold current, $I_{TH}$) is supplied to the LD and an optical output response is produced by the LD. In some embodiments, the duration of each of the positive pulses may be a fraction of the turn-on delay time for the LD, for example, less than 90% of the turn-on delay time, around 50% of the turn-on delay time, etc.

In some aspects, the techniques described herein relate to a data storage device including: a disk; a read/write head configured to read data from and write data to the disk; a laser diode coupled to a near field transducer (NFT) configured to heat an area of the disk near the read/write head; an asymmetric laser diode driver configured to drive the laser diode; and one or more processing devices configured to: preheat the laser diode to a target temperature, wherein the preheating includes: generating at least one bias pulse conforming to one or more tunable parameters, based at least in part on the target temperature; and applying, using the asymmetric laser diode driver, the at least one bias pulse to the laser diode such that no optical response is produced by the laser diode; and initiate a write operation for writing data to the disk.

In some aspects, the techniques described herein relate to a method for operating a data storage device configured for heat-assisted magnetic recording using a laser diode, the method including: preheating the laser diode to a target temperature, wherein the preheating includes: generating at least one bias pulse conforming to one or more tunable parameters, based at least in part on the target temperature; and applying, using an asymmetric laser diode driver, the at least one bias pulse to the laser diode such that no optical response is produced by the laser diode; initiating a write operation for writing data to a disk of the data storage device.

In some aspects, the techniques described herein relate to one or processing devices including: means for preheating a laser diode of a data storage device to a target temperature, wherein the data storage device is configured for heat-assisted magnetic recording using the laser diode, and wherein the means for preheating includes: means for generating at least one bias pulse conforming to one or more tunable parameters, based at least in part on the target temperature; and means for applying the at least one bias pulse to the laser diode such that no optical response is produced by the laser diode; and means for initiating a write operation for writing data to a disk of the data storage device.

In some aspects, the techniques described herein relate to a data storage device including: a disk; a read/write head configured to read data from and write data to the disk; a laser diode configured to heat an area of the disk near the read/write head; an asymmetric laser diode driver configured to drive the laser diode; and one or more processing devices configured to: identify a target temperature for the laser diode; identify one or more tunable parameters, based at least in part on the target temperature; preheat the laser diode to the target temperature, wherein the preheating includes: generating at least one bias pulse conforming to the one or more tunable parameters; and applying, using the asymmetric laser diode driver, the at least one bias pulse to the laser diode such that no optical response is produced by the laser diode; and initiate a write operation for writing data to the disk, based at least in part on the preheating.

In some aspects, the techniques described herein relate to a data storage device, wherein the one or more tunable parameters include a plurality of tunable parameters, including one or more amplitude parameters, and wherein the one or more amplitude parameters include: a first laser diode bias current ($I_P$), wherein $I_P$ is greater than a lasing threshold current; a second laser diode bias current ($I_N$), wherein $I_N$ is lower than the lasing threshold current; a first duration ($T_{PD}$); and a second duration ($T_{ND}$).

In some aspects, the techniques described herein relate to a data storage device, wherein the plurality of tunable parameters further include one or more overshoot parameters, and wherein the one or more overshoot parameters include: a first overshoot amplitude current ($OSA_P$), wherein $OSA_P$ corresponds to a positive overshoot compensation greater than $I_P$; a first overshoot duration ($T_{OPD}$); a second overshoot amplitude current ($OSA_N$), wherein $OSA_N$ corresponds to a negative overshoot compensation lower than $I_N$; and a second overshoot duration ($T_{OND}$).

In some aspects, the techniques described herein relate to a data storage device, wherein generating the at least one bias pulse includes: generating a plurality of current pulses, including at least: a first current pulse spanning the first duration ($T_{PD}$), the first current pulse including a first overshoot portion spanning the first overshoot duration ($T_{OPD}$), wherein a corresponding bias current associated with the first current pulse is greater than the lasing threshold current; and a second current pulse spanning the second duration ($T_{ND}$), the second current pulse including a second overshoot portion spanning the second overshoot duration ($T_{OND}$), wherein a corresponding bias current associated with the second current pulse is lower than the lasing threshold current.

In some implementations, generating the at least one bias pulse further includes driving, by the laser diode driver, the laser diode using the plurality of current pulses.

In some aspects, the techniques described herein relate to a data storage device, wherein: $T_{PD}$ is shorter than a turn-on delay for the laser diode; Topp is shorter than $T_{PD}$; $T_{OND}$ is shorter than $T_{ND}$; and $T_{ND}$ is shorter than $T_{PD}$.

In some aspects, the techniques described herein relate to a data storage device, wherein the asymmetric laser diode driver includes an asymmetric Bipolar Complementary Metal-Oxide Semiconductor (BiCMOS) driver.

In some aspects, the techniques described herein relate to a data storage device, wherein the asymmetric laser diode driver is driven by positive current pulses and negative current pulses, and wherein the positive current pulses have an amplitude that is greater in magnitude than an amplitude of the negative current pulses.

In some aspects, the techniques described herein relate to a data storage device, wherein the asymmetric laser diode driver further includes: a first current mirror for controlling at least an overshoot amplitude for positive or rising transitions of a positive bias current applied to the laser diode; and a second current mirror for controlling at least an overshoot amplitude for negative or falling transitions of a negative bias current applied to the laser diode.

In some aspects, the techniques described herein relate to a data storage device, further including: an oscillator coupled to the asymmetric laser diode driver, the oscillator configured to provide a first pulse width modulation (PWM) signal and a second PWM signal to the asymmetric laser diode driver; wherein the one or more processing devices are further configured to: identify a delay between the first and the second PWM signal; receive, from the first current mirror, a first signal corresponding to a laser diode bias current above a lasing threshold current; receive, from the second current mirror, a second signal corresponding to a laser diode bias current below the lasing threshold current; and receive one or more external reference timing (ERT) signals for controlling a handoff between the asymmetric laser diode driver and the first and the second current mirrors.

In some aspects, the techniques described herein relate to a data storage device, wherein: identifying the one or more overshoot parameters further includes determining a first overshoot duration ($T_{OPD}$) and a second overshoot duration ($T_{OND}$), based at least in part on the identified delay; and generating the at least one bias pulse is further based at least in part on controlling the handoff.

In some aspects, the techniques described herein relate to a data storage device, wherein the one or more ERT signals include a plurality of ERT signals, and wherein the plurality of ERT signals are used to calibrate at least a positive portion of a duty cycle and a negative portion of the duty cycle.

In some aspects, the techniques described herein relate to a data storage device, wherein calibrating the positive portion of the duty cycle includes: calibrating a first duration ($T_{PD}$) during which the laser diode bias current is greater than the lasing threshold current; and calibrating the first overshoot duration (Topp) during which the laser diode bias current is greater than a positive peak laser current ($I_P$), and wherein the first duration ($T_{PD}$) is longer than or includes the first overshoot duration ($T_{OPD}$).

In some aspects, the techniques described herein relate to a data storage device, wherein the peak laser current ($I_P$) is based at least in part on the target temperature, and wherein the target temperature corresponds to a steady-state temperature associated with the write operation.

In some aspects, the techniques described herein relate to a data storage device, wherein calibrating the negative portion of the duty cycle includes: calibrating the second duration ($T_{ND}$) during which the laser diode bias current is lower than the lasing threshold current, and calibrating a second overshoot duration ($T_{OND}$) during which the laser diode bias current is lower than a negative peak laser current ($I_N$), and wherein the second duration ($T_{ND}$) is longer than or includes the second overshoot duration ($T_{OND}$).

In some aspects, the techniques described herein relate to a method for operating a data storage device configured for heat-assisted magnetic recording using a laser diode, the method including: identifying a target temperature for the laser diode; identify one or more tunable parameters, based at least in part on the target temperature; preheating the laser diode to the target temperature, wherein the preheating includes: generating at least one bias pulse conforming to the one or more tunable parameters; and applying, using an asymmetric laser diode driver, the at least one bias pulse to the laser diode such that no optical response is produced by the laser diode; initiating, based at least in part on the preheating, a write operation for writing data to a disk of the data storage device.

In some aspects, the techniques described herein relate to a method, wherein the one or more tunable parameters include a plurality of tunable parameters, including one or more amplitude parameters and one or more overshoot parameters, and wherein the one or more amplitude parameters include: a first laser diode bias current ($I_P$), wherein $I_P$ is greater than a lasing threshold current; a second laser diode bias current ($I_N$), wherein $I_N$ is lower than the lasing threshold current; a first duration ($T_{PD}$), wherein $T_{PD}$ is shorter than a turn-on delay for the laser diode; and a second duration ($T_{ND}$), wherein $T_{ND}$ is shorter than $T_{PD}$; and wherein the one or more overshoot parameters include: a first overshoot amplitude current ($OSA_P$), wherein $OSA_P$ corresponds to a positive overshoot compensation above $I_P$; a first overshoot duration ($T_{OPD}$), wherein $T_{OPD}$ is shorter than $T_{PD}$; a second overshoot amplitude current ($OSA_N$), wherein $OSA_N$ corresponds to a negative overshoot compensation below $I_N$; and a second overshoot duration ($T_{OND}$), wherein $T_{OND}$ is shorter than $T_{ND}$.

In some aspects, the techniques described herein relate to a method, wherein applying the at least one bias pulse includes: generating a plurality of current pulses, including at least: a first current pulse spanning the first duration ($T_{PD}$), the first current pulse including a first overshoot portion spanning the first overshoot duration ($T_{OPD}$), wherein a corresponding bias current associated with the first current pulse is above the lasing threshold current; and a second current pulse spanning the second duration ($T_{ND}$), the second current pulse including a second overshoot portion spanning the second overshoot duration ($T_{OND}$), wherein a corresponding bias current associated with the second current pulse is below the lasing threshold current; and driving, by the asymmetric laser diode driver, the laser diode using the plurality of current pulses.

In some aspects, the techniques described herein relate to a method, wherein the asymmetric laser diode driver includes an asymmetric BiCMOS driver.

In some implementations, the asymmetric laser diode driver (e.g., asymmetric BiCMOS driver) is driven by positive pulses having a larger amplitude and/or magnitude than negative pulses, wherein the negative pulses are also used to drive the asymmetric laser diode driver. As described with reference to FIG. 6A below, the positive pulses may be interspersed with the negative pulses. For instance, each of the negative pulses may be adjacent to two of the positive pulses and vice versa.

In some aspects, the techniques described herein relate to a method, further including: receiving a plurality of external reference timing (ERT) signals; receiving a first pulse width modulation (PWM) signal and a second PWM signal; and identifying a delay between the first and the second PWM signal; and wherein identifying the one or more overshoot parameters further includes determining a first overshoot duration ($T_{OPD}$) and a second overshoot duration ($T_{OND}$), based at least in part on the identified delay.

In some aspects, the techniques described herein relate to a method, wherein generating the at least one bias pulse further includes: calibrating a first duration ($T_{PD}$) during which a laser diode bias current associated with the at least one bias pulse is above a lasing threshold current, based on at least one of the plurality of ERT signals; calibrating the first overshoot duration ($T_{OPD}$) during which the laser diode bias current is above a first laser current ($I_P$); calibrating a second duration ($T_{ND}$) during which the laser diode bias current is below the lasing threshold current, based on at least one of the plurality of ERT signals; and calibrating the second overshoot duration ($T_{OND}$) during which the laser diode bias current is below a second laser current ($I_N$); and wherein the lasing threshold current is lower than the first laser current ($I_P$) and greater than the second laser current ($I_N$).

In some aspects, the techniques described herein relate to one or processing devices including: means for identifying a target temperature for a laser diode of a data storage device configured for heat-assisted magnetic recording using the laser diode; means for identifying one or more tunable parameters, based at least in part on the target temperature; means for preheating the laser diode to the target temperature, wherein the means for preheating includes: means for generating at least one bias pulse conforming to the one or more tunable parameters; and means for applying the at least one bias pulse to the laser diode such that no optical response is produced by the laser diode; and means for initiating a write operation for writing data to a disk of the data storage device, based at least in part on the preheating.

Various further aspects are depicted in the accompanying figures and described below and will be further apparent based thereon.

BRIEF DESCRIPTION OF THE DRAWINGS

Various features and advantages of the technology of this disclosure will be apparent from the following description of particular examples of those technologies, and as illustrated in the accompanying drawings. The drawings are not necessarily to scale; emphasis instead is placed on illustrating the principles of the technological concepts. In the drawings, like reference characters may refer to the same parts throughout different views. The drawings depict only illustrative examples of this disclosure and are not limiting in scope.

FIG. 1C illustrates a block diagram showing a waveguide, a laser diode, a disk, and a slider of a data storage device, according to various aspects of the present disclosure.

FIG. 9A illustrates a schematic diagram of a programmable duty oscillator (PDO) that can be used in conjunction with an asymmetric LD driver for generating positive and negative portions of a duty cycle for DLH in a data storage device, according to various aspects of the disclosure.

FIG. 9B illustrates a conceptual graph showing the positive and negative portions of the duty cycle generated using the PDO in FIG. 9A, according to various aspects of the disclosure.

DETAILED DESCRIPTION

Figure 1A:
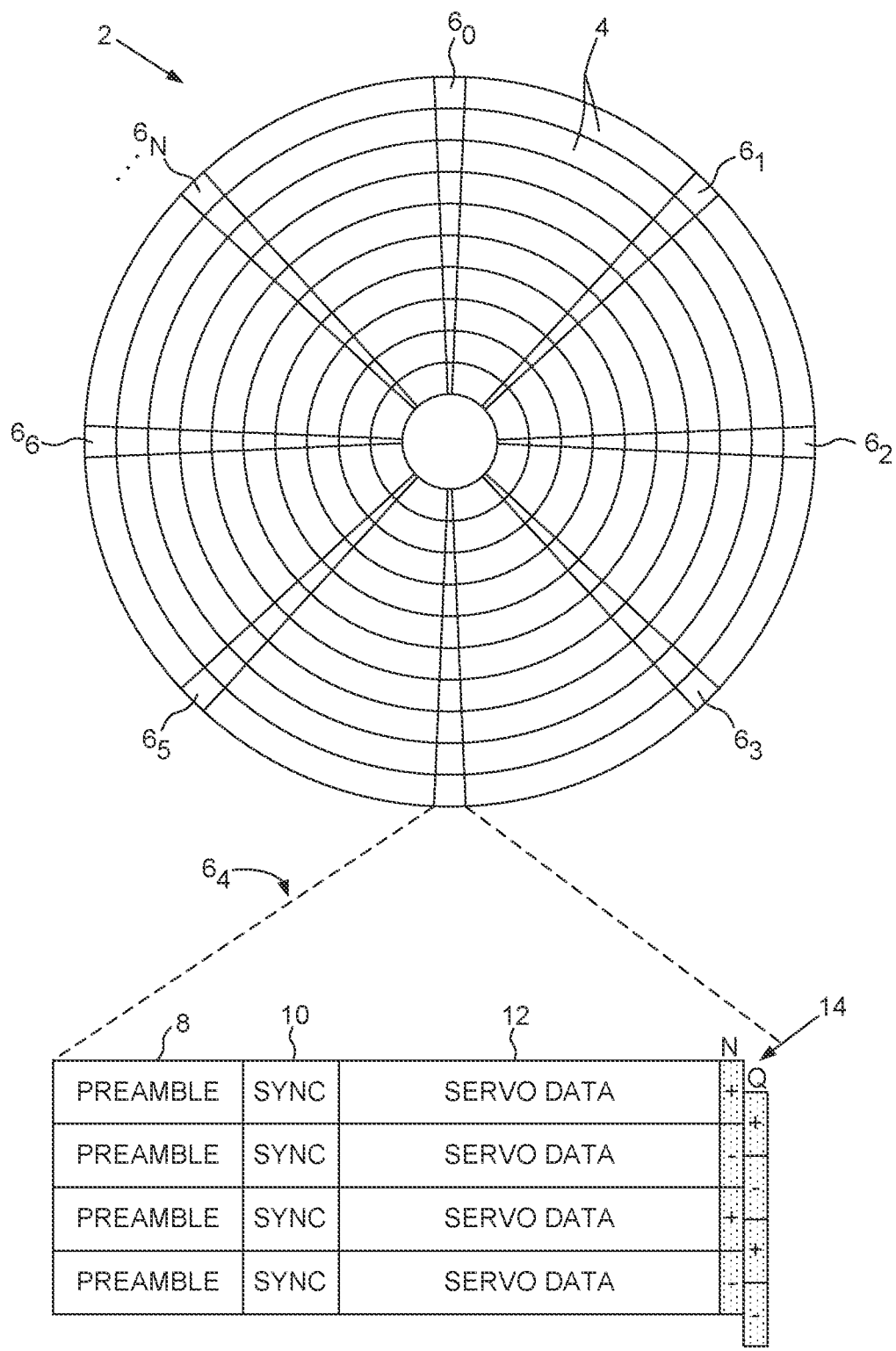
FIG. 1A is a conceptual diagram of a disk format comprising a number of radially-spaced, concentric servo tracks defined by servo wedges recorded around the circumference of each servo track, according to various aspects of this disclosure.

The word "exemplary" is used herein to mean "serving as an example, instance, or illustration." Any embodiment described herein as "exemplary" should not be construed as preferred or advantageous over other embodiments.

The embodiments described below are not intended to limit this disclosure to the precise form disclosed, nor are they intended to be exhaustive. Rather, they are presented to provide a description so that others skilled in the art may utilize their teachings. Technology continues to develop, and elements of the described and disclosed embodiments may be replaced by improved and enhanced items. However, the teachings of this disclosure inherently disclose elements used in embodiments incorporating technology available at the time of this disclosure.

The demand for data storage continues to increase rapidly, driving the need for hard drives that can store more data in the same physical space. However, traditional magnetic recording techniques face a physical limit known as the superparamagnetic limit. This is the point at which magnetic bits become so small that thermal fluctuations can cause them to spontaneously change state, leading to data loss. Heat-assisted magnetic recording (HAMR) is a technology developed to address this issue. HAMR overcomes the superparamagnetic limit by using heat to temporarily reduce the coercivity (resistance to changes in magnetization) of the magnetic material on the disk. This is achieved by using a laser diode (LD) to heat a small area of the disk, enabling data to be written at a higher density to that area. As the heated area cools, its coercivity returns to its original high level, effectively "locking" the data into place. HAMR allows for much higher data densities than traditional magnetic recording techniques, as it allows data bits to be written much more closely together without the risk of thermal instability.

In HAMR, a phenomenon known as "mode hopping" occurs when the LD used for heating the magnetic material switches, or "hops," between different lasing modes. Each mode corresponds to a different pattern of standing waves within the laser diode's cavity, which in turn corresponds to a specific wavelength of emitted light. Mode hopping in HAMR can be induced by temperature variations in the LD (or LD cavity within which the LD is positioned). As the LD operates, it naturally generates heat. Some non-limiting examples of factors that can affect LD temperature include power input, operation duty cycle, ambient temperature, and heat dissipation mechanisms. As the temperature of the LD changes, it can also impact the refractive index and/or physical dimensions of the LD cavity, potentially shifting the wavelength or frequency of the light emitted by the LD. In some instances, this shift may cause the laser to switch from one mode to another, herein referred to as "mode hopping".

In some cases, the mode-hop effects induced in a laser can adversely affect the laser's ability to deliver optical power to the disk media in a consistent/effective manner. Furthermore, as noted above, the mode-hop effects are temperature dependent. In some circumstances, the optical power delivered to the disk media may depend on the reflection and/or absorption occurring in the LD and/or the near-field transducer (NFT). Thus, in some regards, the optical power spectrum of the LD is temperature dependent. Additionally, the frequency response of an optical transmission system may depend on the absorption, reflections, and/or physical length (e.g., length of LD cavity and/or waveguide). The combination of the optical power spectrum's temperature dependence and resonances in the optical transmission system may lead to fluctuations in the optical power delivered to the disk media, which can adversely impact HAMR recording performance.

Broadly, the present disclosure relates to an asymmetric bias LD driver with balanced parasitics that enables implementation of a high-speed positive laser bias architecture for DLH in a HAMR drive. Such a design enables "dark" laser heating of the laser diode to a target or steady state temperature associated with a write operation. This helps avoid or mitigate against mode-hop lasing effects, which serves to optimize HAMR drive performance, as compared to the prior art. In some cases, the asymmetric bias LD driver architecture can be implemented as an add-on feature to existing LD driving circuits utilized in HAMR drives. The present disclosure also supports the use of one or more programmable features/parameters, including, but not limited to, one or more amplitude parameters (e.g., $I_P$, $I_N$, $OSA_P$, $OSA_N$), one or more timing parameters (e.g., $T_{PD}$, $T_{ND}$, $T_{OPD}$, $T_{OND}$), and one or more termination parameters (e.g., programmable termination $R_T$). In some embodiments, an onboard oscillator (e.g., PDO 900-a) can be provided, for instance, to program the bias periods or duty cycle of the LD driver output, described in further detail below.

Figure 3:
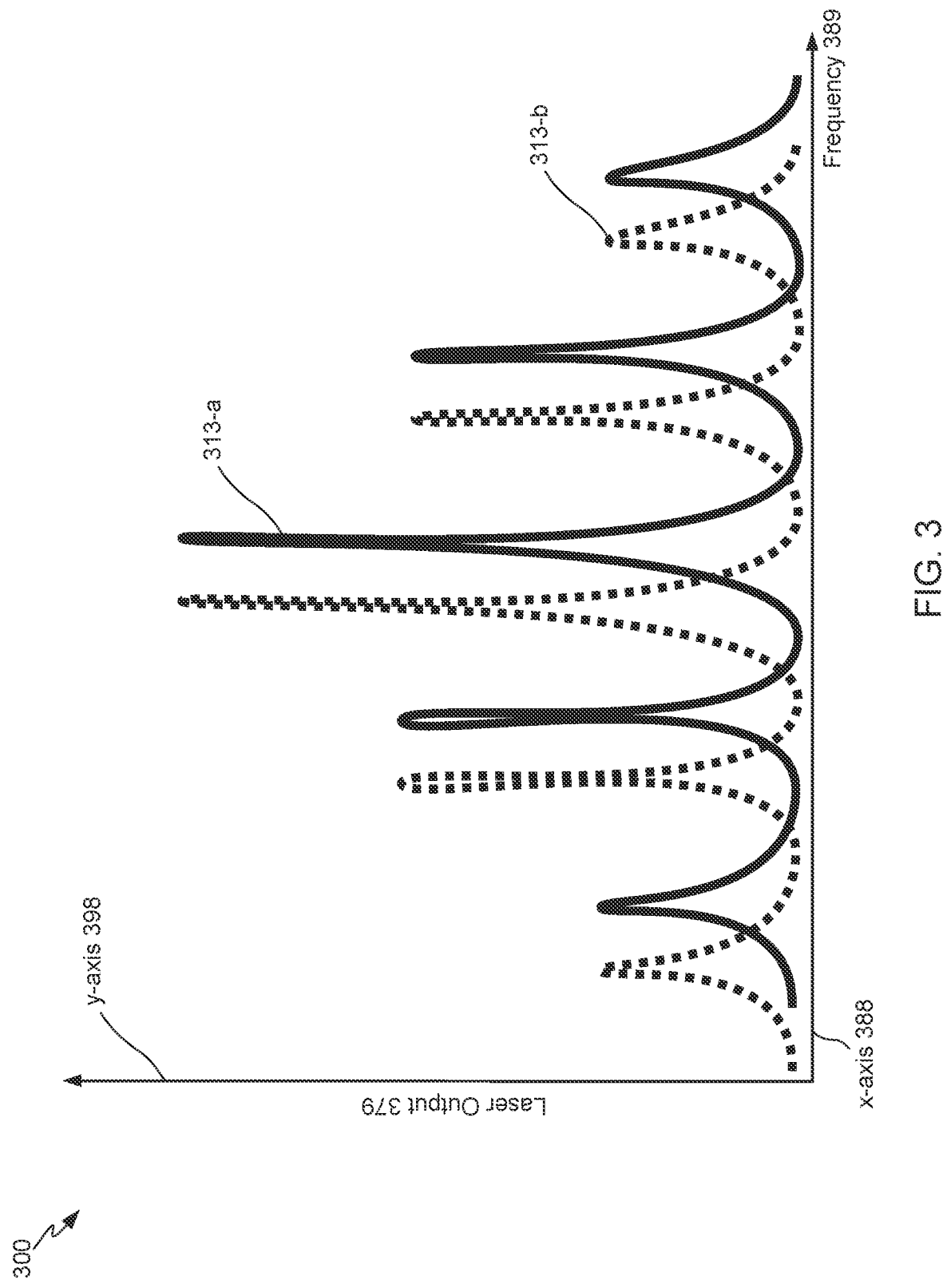
FIG. 3 is a conceptual graph showing an optical power spectrum of a laser diode (LD) utilized in a HAMR drive for two different operating temperatures $T_1$ and $T_2$, according to various aspects of the disclosure.

FIG. 3 depicts a conceptual graph 300 of laser output 379 (on the vertical or y-axis 398) against frequency 389 (on the horizontal or x-axis 388) for two different LD temperatures. Specifically, graph 300 shows a first trace 313-a corresponding to an optical power spectrum (or laser output) for a first LD temperature. Additionally, graph 300 also shows a second trace 313-b corresponding to an optical power spectrum of the same LD at a second LD temperature. In some aspects, FIG. 3 illustrates the temperature dependent nature of the optical output produced by a LD of a HAMR drive.

Mode hopping can have several negative consequences in the context of HAMR. Mode hopping can cause sudden changes in the laser's output power and frequency, leading to variations in the heating of the magnetic material. This can result in inconsistent performance and potentially affect the reliability of the data recording process. Moreover, the optical components in the HAMR head may be optimized for a specific wavelength. If mode hopping causes the laser to emit light at a different wavelength, this could reduce the effectiveness of the heating process. Effective temperature management of the LD is critical to mitigate mode hopping and to maintain reliable operation of the HAMR system.

To mitigate against such issues, aspects of the present disclosure are directed to a technique for preheating the LD and/or LD cavity to a target temperature to minimize or reduce fluctuations in the optical power delivered by the LD. Specifically, but without limitation, aspects of the present disclosure are directed to a positive laser bias electrical control architecture for dark laser heating in HAMR drives. In some cases, the target temperature may correspond to a steady-state temperature associated with a write operation. In some cases, preheating the LD to the steady-state temperature prior to writing data to a disk may help prevent or reduce the likelihood of mode hops due to temperature transients. In some circumstances, a laser encounters "mode hops" when the temperature transient changes. For instance, a laser may suddenly switch from operating in one resonator mode (e.g., producing energy with a first wavelength) to another mode (e.g., producing energy with a second, different wavelength) when the temperature transient equals a mode hop critical temperature. The laser then operates in the new resonator mode (e.g., producing energy with the second wavelength) for a range of temperature transients before switching to a different resonator mode (e.g., producing energy with a third wavelength).

In some instances, dark laser heating or "DLH" may be employed to preheat a LD to the target or steady state temperature prior to the write operation. In such cases, the LD consumes power and generates heat without significantly emitting photons, the particles responsible for light emission. Some prior art DLH techniques utilize a pre-bias below the lasing threshold, which serves to warm up the LD while preventing light emissions. By operating below this lasing threshold (i.e., current or voltage sufficient to causing lasing or produce an optical output from the LD), the LD predominantly performs as a traditional diode, converting the electrical power it receives into heat instead of light. This allows the LD to warm up to a specific temperature without substantial light emission, hence the term "dark" laser heating. However, such techniques tend to be inadequate (e.g., can result in mode changes) when used for power levels that are at or near the operating temperature (e.g., for a write operation).

In some other cases, DLH may comprise applying a reverse bias (or negative voltage) to the LD, where an amount of reverse bias applied is based at least in part on the forward bias associated with the write operation. That is, the reverse bias level applied to preheat the laser diode prior to the write operation is based at least in part on the optical power or temperature associated with the write operation (i.e., when the LD is forward biased). DLH using a reverse bias often requires a large negative bias voltage (e.g., below −15 volts, −17 volts, −20 volts, to name a few non-limiting examples) and effective implementation of such a solution may require high-voltage integrated circuits (ICs) to buffer and control the reverse bias applied to the LD.

As noted above, the LD may act like an ordinary LED when the current supplied to the LD is below the lasing threshold current (i.e., the current at which the LD starts lasing or produces an optical output). Furthermore, when the current supplied to the LD is increased such that it is at or above the lasing threshold current, the gain of the laser equals the loss of the LD cavity and/or mirrors, which leads to an optical output from the LD. In some cases, the turn-on delay may refer to the time between when a bias current (e.g., above the lasing threshold current) is applied to a LD and when an optical output response is produced by the LD. The optical turn-on delay ($\tau$) of the LD is dependent on a variety of factors, including at least the lasing threshold current ($I_{TH}$), pulse bias current ($I_{BIAS}$) supplied to the LD, and/or the average carrier lifetime ($\tau_S$). The average carrier lifetime ($\tau_S$), also referred to as the recombination time, is an inherent property of the LD. As known in the art, emission of light from a laser diode, a LED, etc., is based at least in part on the recombination of electrons and holes.

As described in further detail below, some aspects of the present disclosure are directed to an electrical architecture that is configured to support a high bandwidth system for delivering positive laser bias pulses (i.e., forward biased laser pulses). In some embodiments, the disclosed electrical architecture can be used to control the positive laser bias pulses with a controlled duty cycle. In some cases, the duration or width of the positive laser bias pulses may be shorter than the turn-on delay for the LD, which helps prevent optical emissions from the LD.

In some instances, an asymmetric LD driver may be used to drive the LD. In one non-limiting example, the asymmetric LD driver may utilize a BiCMOS architecture, although other applicable architectures are also contemplated in different embodiments. For example, in some embodiments, the asymmetric LD driver can utilize any other applicable CMOS architecture. In some cases, the asymmetric LD driver may be programmable. For instance, the asymmetric LD driver may be configured to generate bias current pulses (e.g., positive pulses, negative pulses) for driving the LD, where the bias current pulses may be generated based on one or more programmable parameters. Some non-limiting examples of the controlled/programmable parameters may include one or more amplitude parameters (e.g., LD bias above threshold, $I_P$; LD bias below threshold, $I_N$), one or more overshoot parameters (e.g., positive overshoot compensation, $OSA_P$; negative overshoot compensation, $OSA_N$), one or more timing parameters (e.g., LD positive duration, $T_{PD}$; LD negative duration, $T_{ND}$; overshoot positive duration, $T_{OPD}$; overshoot negative duration, $T_{OND}$), and one or more termination parameters (e.g., programmable termination, $R_T$). As noted above, the programmable termination, $R_T$, may refer to a resistive termination across the nodes of the LD driver circuit and may be utilized for impedance matching to the transmission line.

Thus, in some aspects, controlling the one or more programmable parameters enables control of the waveform shape and/or other attributes of the LD driver's output. This in turn allows control/management of dark laser heating (DLH) in the HAMR drive.

Figure 1B:
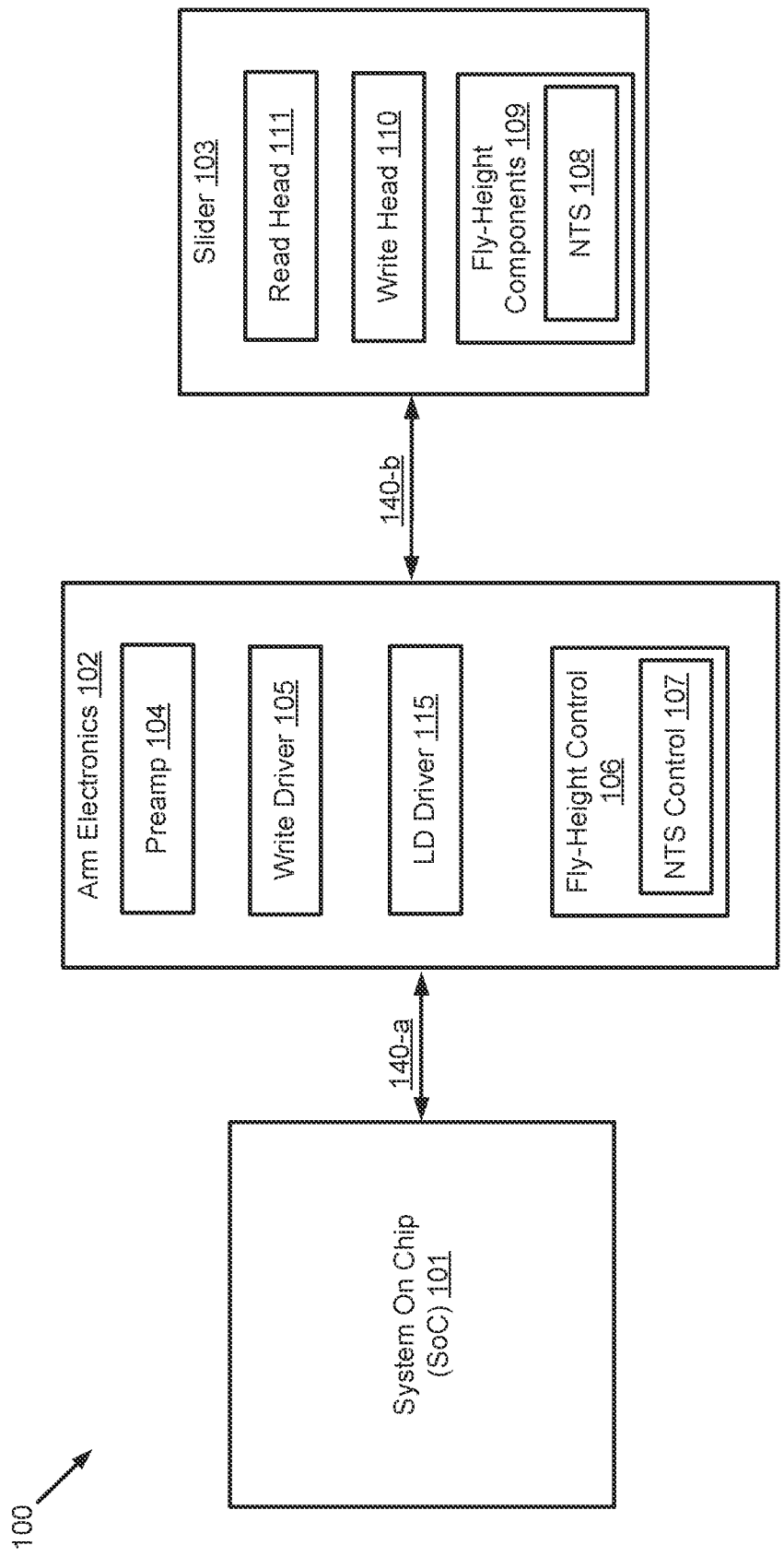
FIG. 1B shows a block diagram illustration of selected components of a disk drive, according to various aspects of the present disclosure.

Turning now to FIG. 1B, which illustrates a block diagram of a disk drive 100 according to various aspects of the disclosure. In some cases, the disk drive 100 may be an example of a HAMR drive. As seen, the disk drive 100 comprises a system on a chip (SoC) 101, where the SoC 101 comprises the electronics and firmware for the drive and used to control the functions of the drive including providing power and/or control signals to the components shown in arm electronics (AE) 102. Each disk (shown as disk 16 in FIG. 1C, disks 16A-D in FIG. 2B) can have thin film magnetic material on each of the planar surfaces. Each recording surface may comprise a dedicated pair of read and write heads packaged in a slider 103 that is mechanically positioned over the rotating disk by an actuator (e.g., shown as actuator assembly 19 in FIG. 2B). In some examples, the actuator(s) also provide the electrical connections to the slider 103 components. The actuator assembly 19 may also comprise the AE 102, the AE 102 comprising preamplifiers or preamps 104 (e.g., read and/or write preamp) for the heads (e.g., read head 111, write head 110), write driver 105, laser diode (LD) driver 115, and fly-height controls 106. In some examples, the fly-height control circuit 106 includes a near field transducer (NFT) temperature sensor (NTS) control circuit 107, for example, when the disk drive employs heat assisted magnetic recording (HAMR). In this example, the fly-height control system also includes NTS 108 in the slider along the associated NTS control circuitry 107 in the AE 102. It is noted that some of the components shown in AE 102 can be implemented or partially implemented in SoC 101, according to various aspects of the disclosure. While the AE 102 is shown as including preamps 104, in some cases, an AE inclusive of some or all of the functional blocks above other than preamps 104 may be implemented together in a preamp IC, and the AE may be referred to as preamp IC 102 below. Furthermore, in some cases, the LD driver 115 may be similar or substantially similar to any of the other LD driver(s) described herein, such as, but not limited to, LD driver 501 in FIG. 5A and/or LD driver 500-b in FIG. 5B.

As seen, a first connection (e.g., flex cable) 140-a connects the SoC 101 to the AE 102, while a second connection (e.g., flex cable) 140-b connects the AE 102 to the slider 103. The AE 102 typically include digital and analog circuitry that control the signals sent to the components in the slider 103 and process the signals received from the components of the slider 103. The AE 102 can include registers (e.g., register settings 506-a, 506-b in FIG. 5A) that are set using serial data from the SoC 101 to provide parameters for the AE functions. Some non-limiting examples of such parameters may include the programmable amplitude, overshoot, and/or timing parameters for the LD driver, described in further detail below. The write driver 105 generates an analog signal that is applied to an inductive coil in the write head 110 to write data by selectively magnetizing portions of the magnetic material on the surface of the rotating disk(s) 16. It is noted that while AE is so named as the electronic components are generally placed at the arm actuators in various embodiments, the actual physical location may vary in other embodiments.

As a disk rotates under a slider of a hard disk drive (HDD), the slider 103 is said to "fly" above the disk. In some cases, a thermal fly-height control (TFC) device (e.g., heater element) can be disposed within the slider 103 to contort the slider near the read and write transducers (or elements), which lowers the fly-height for the read and write transducers. In some examples, read and write elements or transducers reside in the slider 103 of the disk drive 100. In some cases, the disk drive 100 comprises fly-height control circuitry 106 that interfaces with fly-height components in the slider 103. TFC is one example of a control technique that uses a heater element (not shown) disposed in the slider 103. The fly-height can be adjusted by heating the slider 103 with the heater. Electrical current supplied to the heater by fly-height control circuitry 106 generates heat to thermally expand the slider 103 and modulate the fly-height. As seen, the slider 103 also includes fly-height components 109 and the NTS 108. In some embodiments, the fly-height components 109 can also include other elements in addition to the heater.

The slider 103 includes write head 110 configured to write data to a disk (e.g., disk 16), a read head 111 configured to read data from the disk, fly-height components 109 configured to adjust slider fly-height (as described above) and a resistive temperature detector (RTD), such as NTS 108, for sensing the temperature near the air-bearing surface (ABS). It is noted that ABS is generally used to describe the surface of the slider 103 facing the disk 16, where the disk drive could be filled with gases other than air (e.g., gases containing helium, nitrogen, to name two non-limiting examples) and that the use of the "ABS" term to describe various aspects of the disclosure is not intended to limit the disclosure to air filled drives. In some cases, the NTS 108 is located proximate to the ABS and write head 110 (or alternatively the read head 111). The NTS 108 facilitates detecting a temperature generated by the slider's proximity to the disk or media. In various embodiments, the NTS 108 may comprise a thermal strip (e.g., metallic or semiconductor strip) on the slider 103. In some cases, the relative temperature at the ABS may be used to estimate the resistance, $R_{RTD}$, of the RTD, such as an embedded contact sensor (ECS) or the NTS 108. Typically, the resistance of a material can be represented as a function of its intrinsic resistance and its dimensions (e.g., length, width, thickness or height).

In some cases, a HAMR recording head (e.g., write head 110) also comprises optical components that direct light from a laser to the disk. During recording, a write element applies a magnetic field to a heated portion of the storage medium or disk 16, where the heat lowers the magnetic coercivity of the media, allowing the applied field to change the magnetic orientation of the heated portion. The magnetic orientation of the heated portion determines whether a one or a zero is recorded. Thus, by varying the magnetic field applied to the magnetic recording medium while it is moving, data can be encoded onto the medium. A HAMR drive employs a laser diode or LD (e.g., laser diode 128 in FIG. 1C) to heat the media to aid in the recording process. In some cases, the LD 128 is disposed within an LD cavity and is proximate to a HAMR read/write element 144, where the read/write element 144 has one end on the ABS of the slider 103. The ABS faces and is held proximate to a moving media surface (e.g., surface of disk 16) during operation of the HDD. In some cases, the LD, such as LD 128, may be driven by a LD driver (e.g., LD driver 115 in AE or preamp IC 102, as shown in FIG. 1B). In other embodiments, the LD can be driven by other components within the broader control circuitry 22 in the drive such as the SoC or other circuitry.

The LD 128 provides optical-based energy to heat the media surface, e.g., at a point near the read/write element 144. In some cases, optical path components, such as a waveguide 131, are formed integrally within the slider 103 to deliver light from the LD 128 to the NFT 134 which provides targeted heat to the media/disk. For example, as shown in FIG. 1C, a waveguide 131 and NFT 134 are located proximate to the read/write element 144 to provide local heating of the media or disk 16 during write operations. In some circumstances, various components (e.g., read/write element 144, NFT 134, LD 128, etc.) may experience significant heating due to light absorption and inefficiencies in electrical-to-optical energy conversion as energy produced by the LD 128 is delivered to the magnetic recording medium or disk 16. In some cases, for example, during the start of a write operation, the temperature of the LD experiences significant variations, causing a shift in laser emission wavelength. This in turn leads to a change of optical feedback from the optical path in the slider 103 to the LD cavity, resulting in mode hopping (i.e., power instability) of the LD 128. Mode hopping can degrade performance of HAMR drives, as mode hopping leads to shifting/jumping of laser output power leading to one or more of magnetic track width variations and magnetic transition shifting between data blocks. Large transition shifts in data blocks may increase errors, degrading disk drive performance and/or causing encroachment on adjacent data tracks.

Broadly, aspects of the present disclosure are directed to an electrical control architecture that enables the use of a high bandwidth system for delivering positive bias pulses (i.e., at or above the lasing threshold current) to an LD, for instance, to preheat the LD to a target temperature (e.g., steady state temperature associated with a write operation) while preventing or minimizing optical emissions from the LD, described in further detail below. In some examples, the LD driver 115 is a programmable LD driver and utilizes a novel asymmetric BiCMOS architecture. Some aspects of the present disclosure are directed to techniques for bias control for heating and DLH management in HAMR drives. In some instances, the LD 128 may be preheated to a temperature that is at or near the steady state temperature associated with the write operation using positive/forward bias pulses generated by the LD driver, herein referred to as DLH-pulse bias. In some cases, the LD driver may drive the LD in an asymmetric fashion. For instances, the LD driver output may comprise a plurality of bias pulses of duration $T_{PD}$ and a plurality of bias pulses of duration $T_{ND}$, where each bias pulse of duration $T_{ND}$ is adjacent two bias pulses of duration $T_{PD}$ and vice versa. In other words, each positive pulse (i.e., bias above lasing threshold current) of duration $T_{PD}$ may be followed by a negative pulse (i.e., bias below lasing threshold current) of duration $T_{ND}$, which helps bring the bias current level below the lasing threshold current and prevent lasing.

In some cases, each bias pulse of duration $T_{PD}$ may correspond to an LD bias, $I_P$, where $I_P$ is above the lasing threshold current, while each bias pulse of duration $T_{ND}$ may correspond to an LD bias, $I_N$, where $I_N$ is below the lasing threshold current. In other words, $I_P > I_{TH} > I_N$. In some cases, the duration $T_{PD}$ may be longer than the duration $T_{ND}$, but shorter than the turn-on delay for the LD. This facilitates preheating of the LD to the target or steady-state temperature while ensuring minimal to no optical output from the LD. In some aspects, the LD driver output resembles a PWM signal having an asymmetric duty cycle (i.e., not a 50% duty cycle), where the "ON" or "positive" portion of the PWM signal corresponds to the bias pulses that are above the lasing threshold current and the "OFF" or "negative" portion of the PWM signal corresponds to the bias pulses that are below the lasing threshold current. In some cases, the present disclosure allows calibration of the positive and negative portions of the duty cycle, for instance, using an external reference signal. Such a design allows for a higher level of bias control for heating and/or DLH management in HAMR drives, as compared to the prior art.

In some embodiments, the duration or width (e.g., $T_{PD}$) of the forward bias pulses may be selected to be lower than a turn-on time delay (T) of the LD 128, which prevents the LD 128 from producing an optical output. Alternatively, the duration or width of each current cycle (i.e., including a positive pulse/portion of duration $T_{PD}$ and a negative pulse/portion of duration $T_{ND}$) may be selected to be lower than the turn-on time delay of the LD 128. In some instances, the absence of an optical output response from the LD while preheating the LD can help optimize HAMR drive performance and minimize or reduce the risk of data erasure/degradation.

Figure 2A:
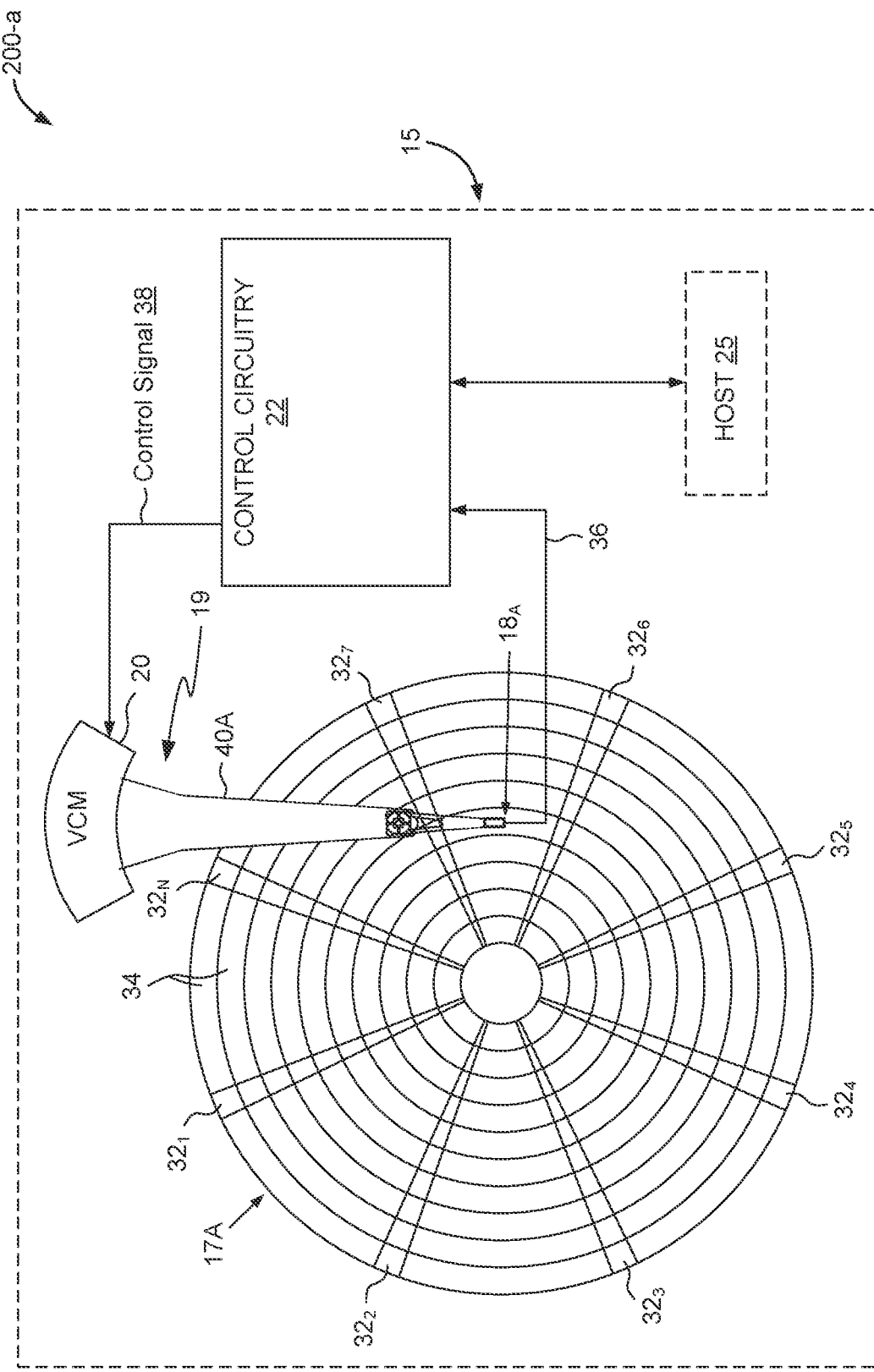
FIG. 2A is a conceptual block diagram of a top view of a data storage device in the form of a disk drive, according to various aspects of this disclosure.
Figure 2B:
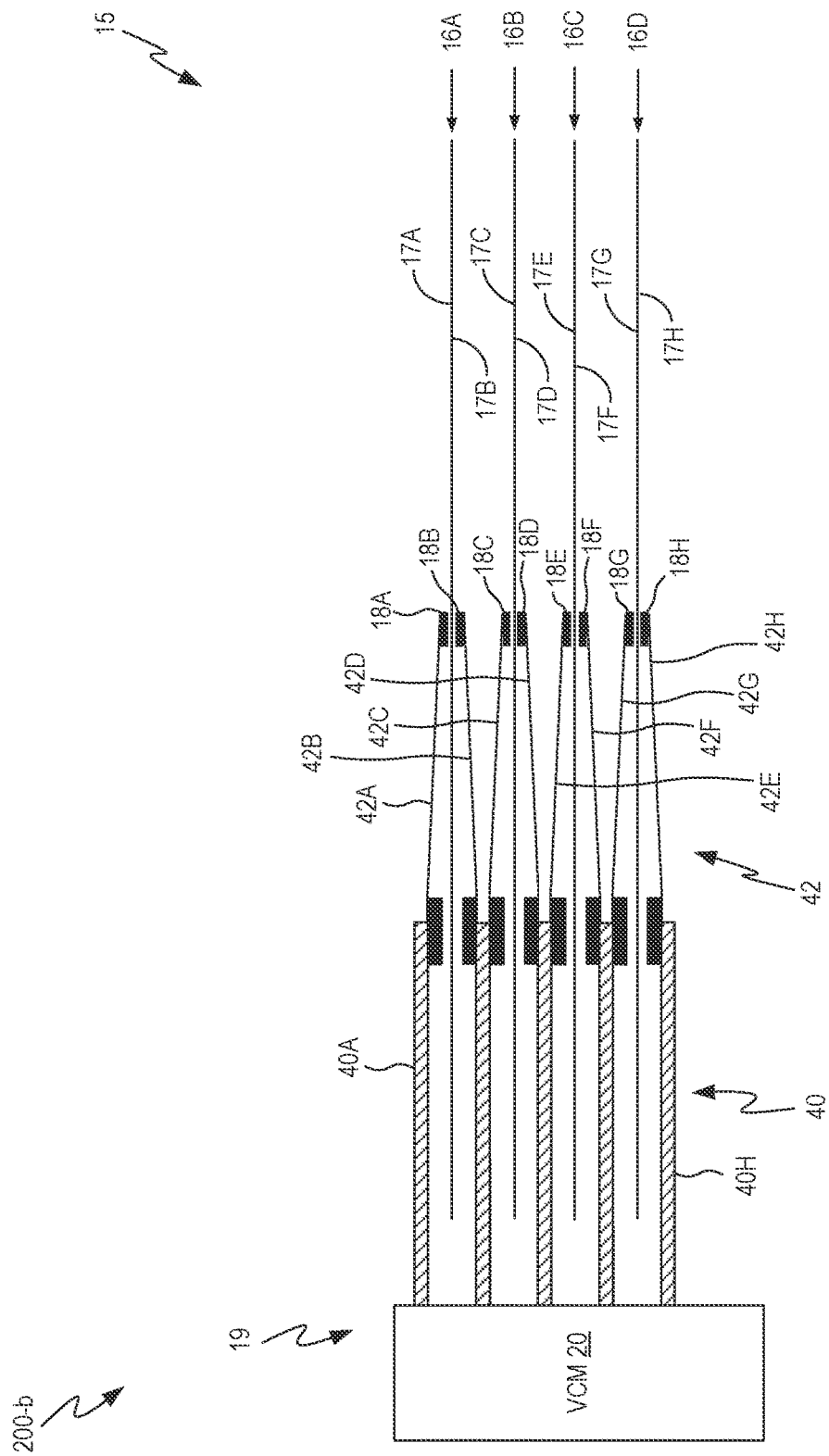
FIG. 2B is a conceptual block diagram of a side view of the data storage device in FIG. 2A, according to various aspects of this disclosure.

FIGS. 2A and 2B are conceptual top and side views 200-*a* and 200-*b*, respectively, of a data storage device in the form of disk drive 15, in accordance with various aspects of this disclosure. Disk drive 15 implements one or more aspects of the disk drives 100 and/or 150 described above in relation to FIGS. 1B and/or 1C, respectively. As seen in FIGS. 2A-2D, the disk drive 15 comprises control circuitry 22, actuator assembly 19, and a plurality of hard disks 16 (i.e., disks 16A, 16B, 16C, 16D).

Actuator assembly 19 is configured to position one or more heads 18 over disk surfaces 17 of one or more disks 16. Head(s) 18 comprise write and read elements, configured for writing and reading control features and/or data to and from a corresponding disk surface 17 (e.g., disk surfaces 17A, 17B, 17C, 17D, 17E, 17F, 17G, 17H) of disk(s) 16. In some cases, head(s) 18 may be similar or substantially similar to the read head 111 and/or write head 110 described in relation to FIG. 1B. As seen in FIG. 2B, actuator assembly 19 comprises primary actuator 20 (e.g., a voice coil motor ("VCM")) and a number of actuator arms 40 (e.g., topmost actuator arm 40A, lowest actuator arm 40H). Each actuator arm 40 comprises a head 18 at a distal end thereof (e.g., head 18A at a distal end of topmost actuator arm 40A in FIGS. 2A-2B). Each actuator arm 40 is configured to suspend a respective head 18 in close proximity over a corresponding disk surface 17 (e.g., head 18A suspended by topmost actuator arm 40A over topmost corresponding disk surface 17A, heads 18B through 18G suspended over corresponding disk surfaces 17B through 17G, head 18H suspended by lowest actuator arm 40H over lowest corresponding disk surface 17H). In the example shown in FIG. 2B, a suspension assembly 42 (e.g., suspension assembly 42A, suspension assembly 42B, suspension assembly 42C, suspension assembly 42D, suspension assembly 42E, suspension assembly 42F, suspension assembly 42G, suspension assembly 42H) is positioned at a distal end of a respective actuator arm 40, and a head 18 (e.g., head 18A, head 18B, head 18C, head 18D, head 18E, head 18F, head 18G, head 18H) is positioned at a distal end of a respective suspension assembly 42. Various examples may include a wide variety of other numbers of hard disks and disk surfaces, other numbers of actuator arm assemblies and primary actuators, other numbers of suspension assemblies, and/or other numbers of fine actuators on each actuator arm than those illustrated in FIGS. 2A-2B.

FIG. 2A also depicts servo sectors 32 (e.g., servo sectors 321 through 32N) written onto disk surfaces 17 (e.g., disk surfaces 17A, 17B, 17C, 17D, 17E, 17F, 17G, 17H). Servo sectors 32 may be written to disk surfaces 17 to define a plurality of evenly-spaced, concentric tracks 34. Each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align a head 18 with and relative to a particular track 34. Each track 34 includes a plurality of embedded servo sectors 32 utilized in seeking and track following. Servo sectors 32 are spaced sequentially around the circumferences of circumferential tracks 34 and extend radially outward from the inner diameter (ID) of disk surface 17. Servo sectors 32 contain servo information utilized in seeking and track following and are interspersed between data regions on disk surfaces 17. Data is conventionally written in the data regions in a plurality of discrete data sectors. Each data region is typically preceded by a servo sector 32.

Control circuitry 22 may also process a read signal 36 emanating from head 18A to demodulate servo data written on the disk (e.g., servo sectors 32) to generate a position error signal (PES) representing an error between the actual position of the head and a target position relative to a target track. Control circuitry 22 may process the PES using a suitable servo control system to generate control signal 38 (e.g., a VCM control signal) applied to VCM 20 which rotates actuator arm 40 about a pivot in order to actuate head 18 radially over disk surface 17 in a direction that reduces the PES. In some embodiments, disk drive 15 may also comprise a suitable micro actuator, such as a suitable piezoelectric (PZT) element for actuating head 18 relative to a suspension (e.g., suspension assembly 42 in FIG. 2B), or for actuating a suspension relative to actuator arm 40.

Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

Each read/write head 18 is conventionally embedded in the trailing edge of a component known as a slider (e.g., slider 103 in FIGS. 1B and/or 1C). The slider in turn is affixed to a suspension (e.g., suspension assembly 42), which is found at the terminating end of actuator arm 40. As disk 16 spins at a high speed, the slider is lifted, or 'flies', above disk 16. It hovers on a thin layer of air, maintaining a stable distance measured in nanometers from disk surface 17. This minuscule distance permits read/write heads 18 to retrieve or store data while avoiding direct physical contact with disk surface 17, thereby preventing data corruption and potential damage to disk surface 17.

Figure 2C:
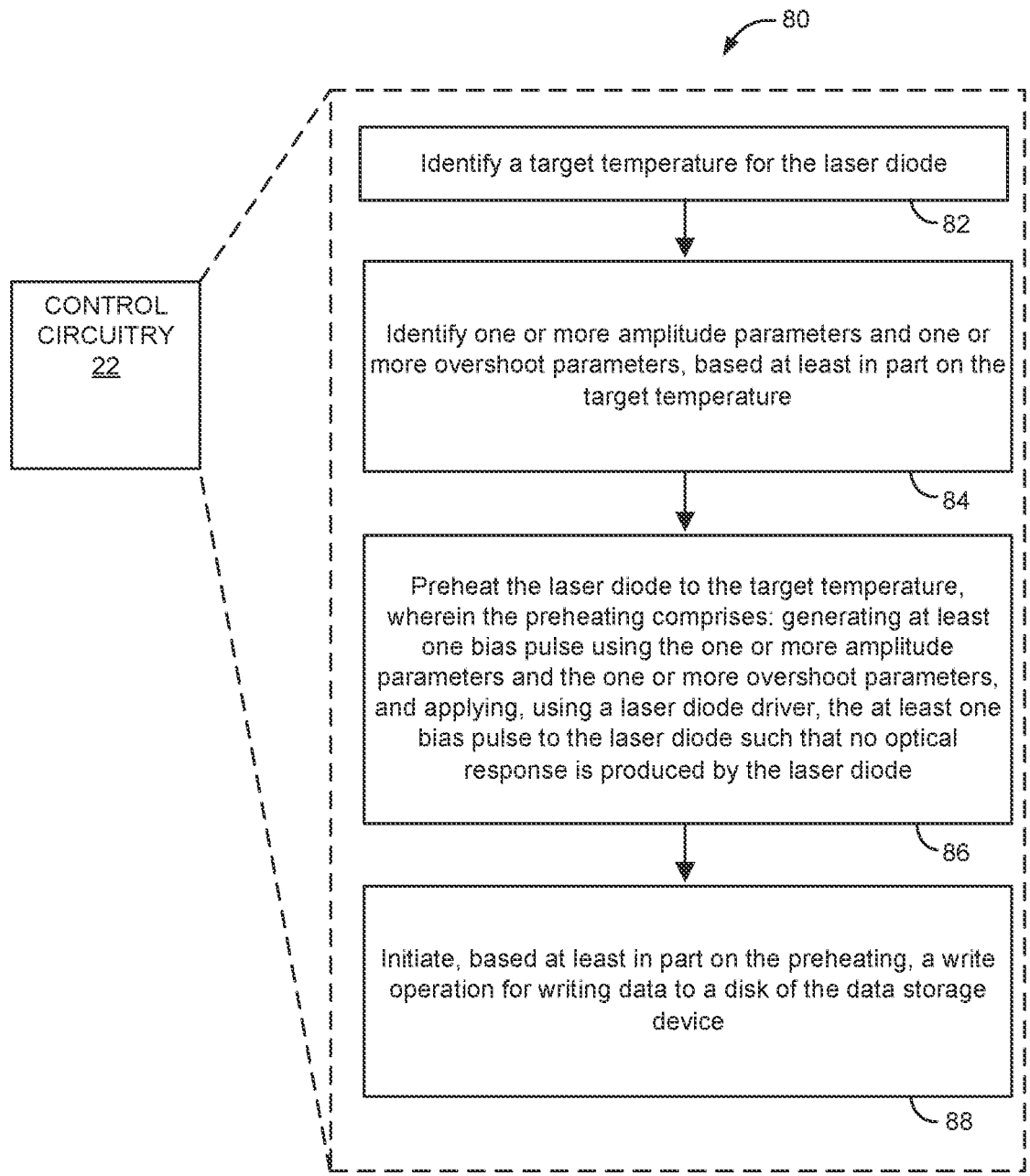
FIG. 2C is a flow diagram of a method that a data storage device may perform, execute, and implement, according to various aspects of this disclosure.

FIG. 2C is a flow diagram of a method 80 that control circuitry 22 of disk drive 15 may perform or execute in controlling the operations of disk drive 15, including the operations of HAMR components on heads 18 (e.g., heads 18A, 18B, 18C, 18D, 18E, 18F, 18G, and/or 18H) disposed on actuator assembly 19, as further described below. In particular, method 80 can help mitigate laser diode mode hopping during HAMR using a DLH technique, as will be described in detail below.

As seen, a first operation 82 of the method 80 may comprise identifying a target temperature for the laser diode. A second operation 84 may comprise identifying one or more amplitude parameters and one or more overshoot parameters, based at least in part on the target temperature. In some cases, a third operation 86 of the method 80 may include preheating the laser diode to the target temperature, wherein the preheating comprises (1) generating at least one bias pulse using the one or more amplitude parameters and the one or more overshoot parameters, and (2) applying, using a laser diode driver, the at least one bias pulse to the laser diode such that no optical response is produced by the laser diode. Next, a fourth operation 88 may comprise initiating, based at least in part on the preheating, a write operation for writing data to a disk of the data storage device.

Figure 2D:
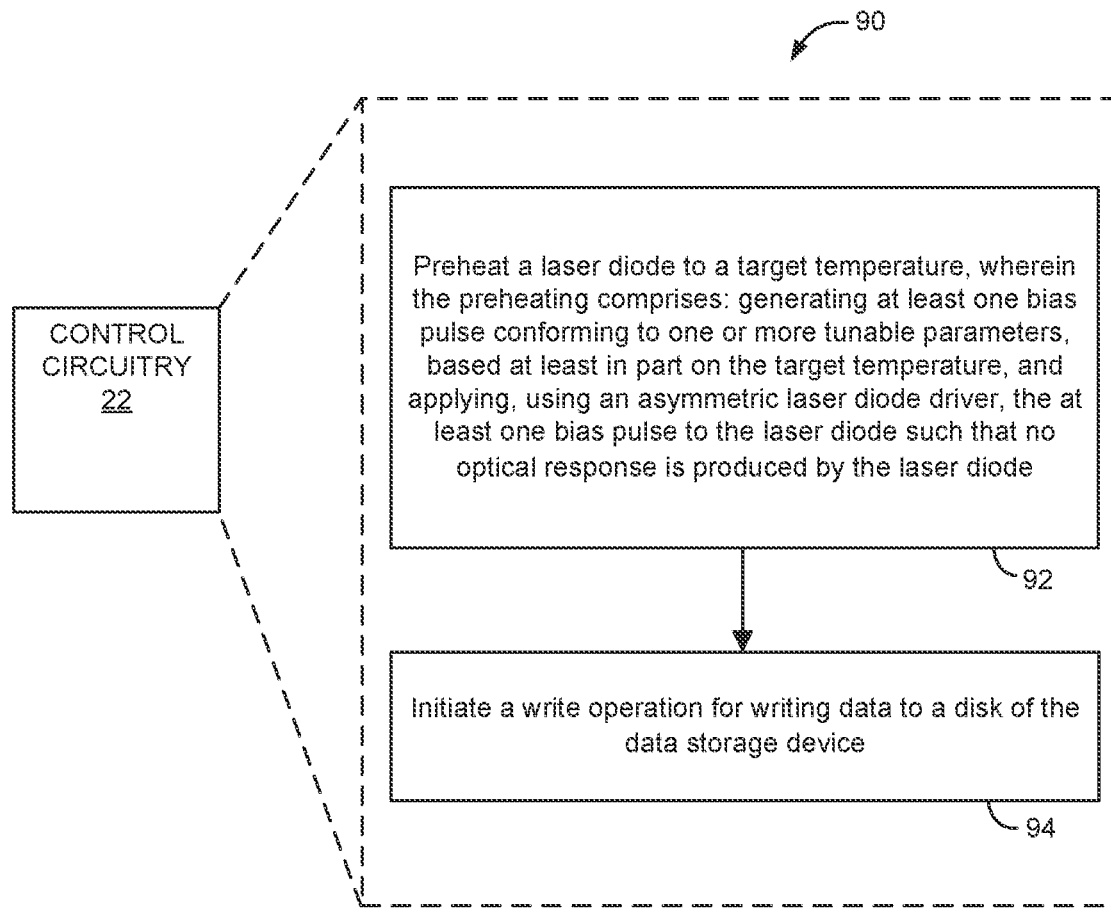
FIG. 2D is a flow diagram of a method that a data storage device may perform, execute, and implement, according to various aspects of this disclosure.

FIG. 2D is a flow diagram of a method 90 that control circuitry 22 of disk drive 15 may perform or execute in controlling the operations of disk drive 15, including the operations of HAMR components on heads 18 (e.g., heads 18A, 18B, 18C, 18D, 18E, 18F, 18G, and/or 18H) disposed on actuator assembly 19, as further described below. In particular, method 90 can help mitigate laser diode mode hopping during HAMR using a DLH technique, as will be described in detail below.

As seen, a first operation 92 of the method 90 may comprise preheating a laser diode to a target temperature, wherein the preheating comprises (1) generating at least one bias pulse conforming to one or more tunable parameters, based at least in part on the target temperature, and (2) applying, using an asymmetric laser diode driver, the at least one bias pulse to the laser diode such that no optical response is produced by the laser diode. Next, a second operation 94 may comprise initiating a write operation for writing data to a disk of the disk drive 15 (or data storage device 15). The data storage device may be configured for heat-assisted magnetic recording (HAMR) using the laser diode. Furthermore, the laser diode may be coupled to a near field transducer (NFT), where the NFT is configured to heat an area of the disk near a read/write head, where the read/write head is configured to read data from and write data to the disk. In some examples, the asymmetric laser diode driver (e.g., asymmetric BiCMOS driver) may be configured to drive the laser diode.

Figure 4A:
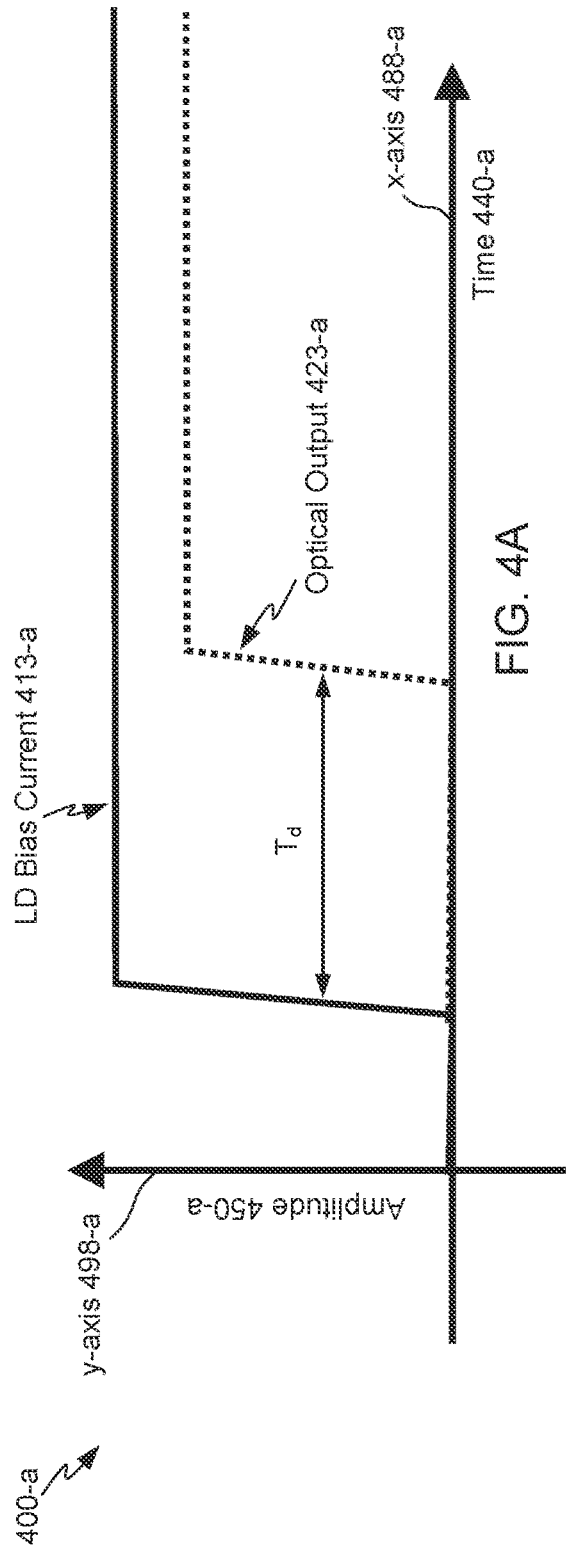
FIG. 4A is a conceptual graph depicting the turn-on time delay ($T_d$) for a LD, according to various aspects of the disclosure.

Turning now to FIG. 4A, which illustrates a conceptual graph 400-a depicting the turn-on time delay ($T_d$) for a LD, according to various aspects of the disclosure. In FIG. 4A, time 440-a is shown along horizontal or x-axis 488-a, while amplitude 450-a (e.g., optical output of LD, which may be measured using a photodiode (PD) or another light sensor) is shown along vertical or y-axis 498-a. As seen, there is an optical turn-on delay ($T_d$) between when the bias current (i.e., above the lasing threshold current) is applied to the LD and when the LD produces an optical output response. In some implementations of DLH, one or more short interval forward bias pulses can be applied to the LD, where the duration/width of the short interval forward bias pulses can be selected to be less than the turn-on delay ($T_d$) of the LD.

Figure 4B:
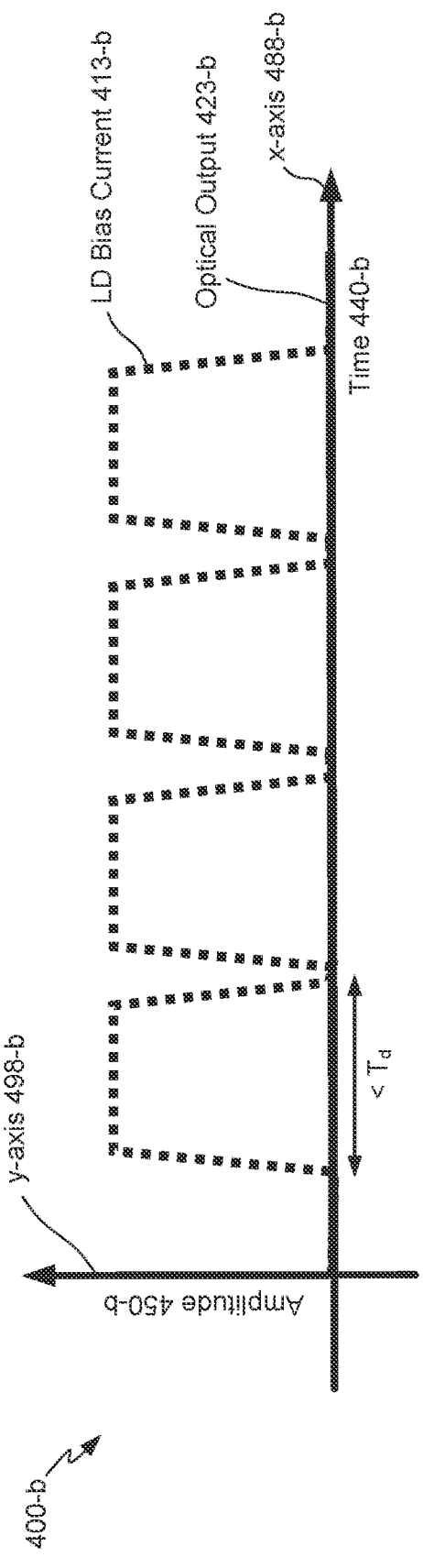
FIG. 4B is a conceptual graph showing a plurality of forward/positive bias pulses applied to a LD to preheat the LD using dark laser heating (DLH), according to various aspects of the disclosure.

For instance, as shown in conceptual graph 400-b in FIG. 4B, a plurality of forward bias pulses are applied to the LD, each having a duration/width that is less than the turn-on delay of the LD. In such cases, the electrical energy supplied to the LD helps warm up the LD and/or LD cavity. Specifically, the temperature rise of the LD and/or LD cavity is based at least in part on the amplitude (e.g., root mean square (RMS) amplitude) of the bias voltage/current applied to the LD. FIG. 4B depicts a plurality of forward bias pulses 413-b, each having a duration that is less than the turn-on delay for the LD. Here, the forward bias pulses 413-b correspond to the LD bias current. Additionally, FIG. 4B also shows the optical output response 423-b. As seen, when the duration of the forward bias pulses is less than the turn-on delay ($T_d$) for the LD, no optical output 423-b is observed from the LD. It should be noted that the peak or RMS amplitude of the LD bias current may be greater than the lasing threshold current (i.e., the current at which the LD starts lasing or produces an optical output). In some examples, the LD driver 115 (also shown as LD driver 501 in FIG. 5A, LD driver 500-b in FIG. 5B) in the AE or preamp IC may be used to drive the LD as aligned to the timing of FIGS. 4A, 4B, 6A, 6B, and/or 9B. In other embodiments, the LD can be driven by other components within the broader control circuitry 22 in the drive such as the SoC or other circuitry.

Figure 5A:
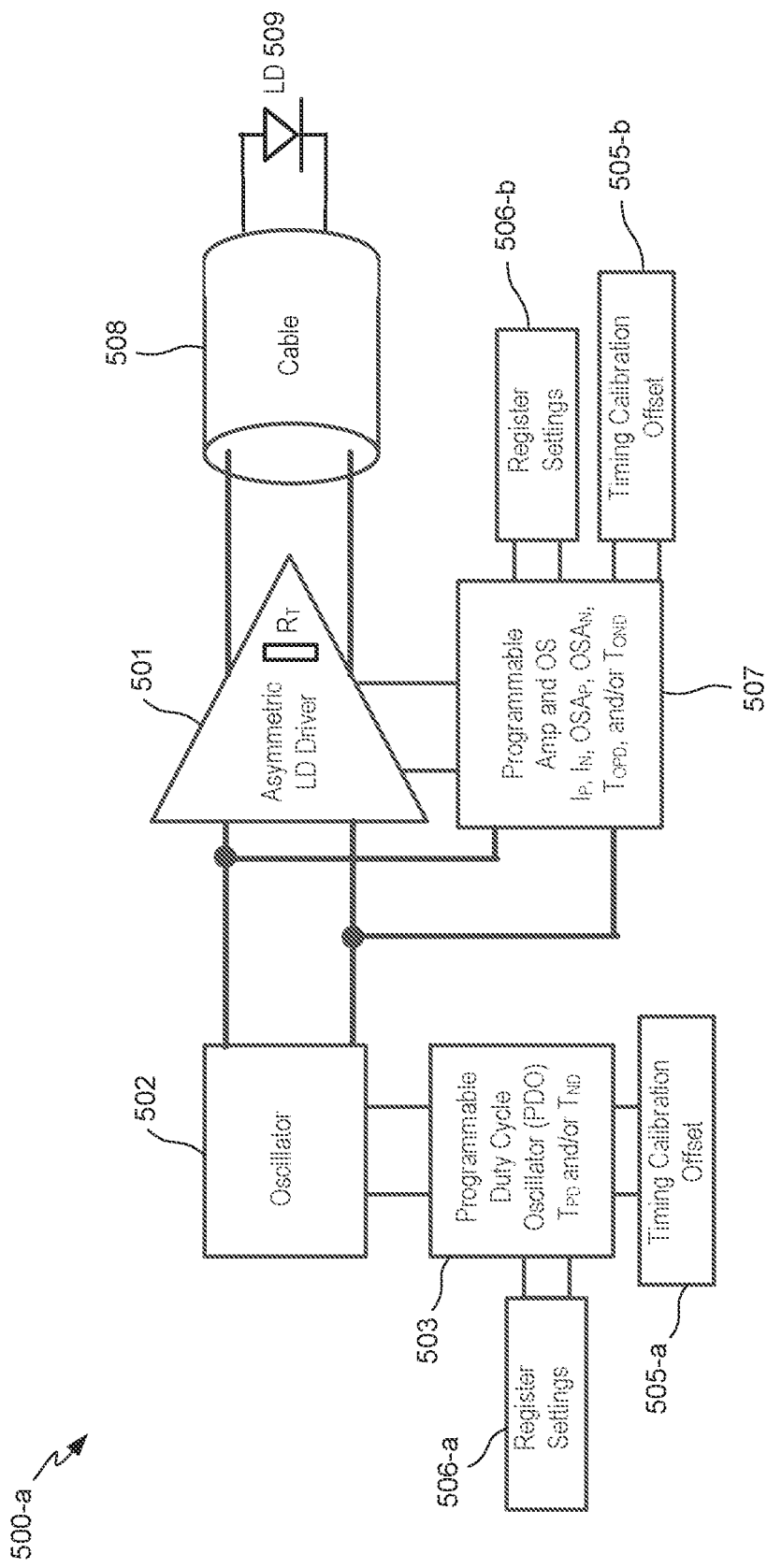
FIG. 5A illustrates a block diagram showing a programmable LD driver configured for driving a LD of a data storage device, according to various aspects of the disclosure.

FIG. 5A illustrates a block diagram 500-a of an asymmetric LD driver architecture for a HAMR drive (e.g., previously described in relation to FIGS. 1B, 1C, and/or 2A) according to various aspects of the disclosure. As seen, the LD driver architecture includes an asymmetric LD driver 501, an oscillator 502, and an LD 509. Here, the LD driver 501 is coupled to the LD 509 using a transmission line 508 (or interconnect 508). The interconnect 508 may be an example of a high-speed high bandwidth interconnect. In some cases, the oscillator 502 is coupled to a programmable duty cycle oscillator (PDO) 503. Alternatively, the oscillator 502 and PDO 503 may be deployed as a single unit. In yet other cases, the oscillator 502 may be optional, and the PDO 503 may be directly coupled to the LD driver 501. In either case, the PDO 503 may be configured to receive information related to one or more of register settings 506-a and a timing calibration offset 505-a, as shown in FIG. 5A. Furthermore, the PDO 503 may be utilized to calibrate one or more of the LD positive duration ($T_{PD}$) and the LD negative duration ($T_{ND}$), where $T_{PD}$ corresponds to the duration during which the LD bias is above the lasing threshold current, and $T_{ND}$ corresponds to the duration which the LD bias is below the lasing threshold current.

As shown in FIG. 5A, the amplitude and overshoot (OS) of the bias pulses (i.e., positive pulses, negative pulses) generated by the asymmetric LD driver 501 can also be programmed. For instance, programmable amplitude and overshoot block 507 may be used to calibrate one or more amplitude parameters (e.g., LD bias $I_P$ above lasing threshold, LD bias $I_N$ below lasing threshold) and one or more OS parameters (e.g., positive overshoot compensation $OSA_P$, negative overshoot compensation $OSA_N$, overshoot positive duration $T_{OPD}$, overshoot negative duration $T_{OND}$) based on register settings 506-b and timing calibration offset 505-b.

Thus, as described above, the register settings 506-a and/or 506-b may be determined based on a calibration procedure, and may be used to determine an optimum setting for the PDO 503 and a respective timing calibration offset 505-a or 505-b.

In some embodiments, one or more of the overshoot parameters (e.g., $OSA_P$, $OSA_N$, $T_{OPD}$, $T_{OND}$) may be optional. In one non-limiting example, only one of the positive or negative pulses may include an overshoot. For instance, the positive pulses may have no overshoot, in which case $OSA_P$ and $T_{OPD}$ are zero or not utilized to generate the bias pulses. In this case, the negative overshoot compensation $OSA_N$ and overshoot negative duration $T_{OND}$ may be non-zero and may be utilized to generate the bias pulses. In another example, $OSA_P$ and $T_{OPD}$ may be utilized, while $OSA_N$ and $T_{OND}$ may not be utilized, to generate the bias pulses. In yet other cases, none of $OSA_P$, $OSA_N$, $T_{OPD}$, and $T_{OND}$ may be utilized to generate the bias pulses.

In some embodiments, the OS parameters may be independently programmed. Alternatively, the positive overshoot compensation, $OSA_P$, may be set as a percentage of $I_P$, and negative overshoot compensation, $OSA_N$, may be set as a percentage of $I_N$. As an example, $OSA_P$=10% of $I_P$ and $OSA_N$=7% of $I_N$. Similarly, in some embodiments, $T_{OPD}$ and $T_{OND}$ may also be set as a percentage of $T_{PD}$ and $T_{ND}$, respectively. In some cases, the same percentage (e.g., 5%, 15%, etc.) may be used to set $OSA_P$ and $T_{OPD}$, and the same percentage (e.g., 3%, 7%, etc.) may be used to set $OSA_N$ and $T_{OND}$. In yet other cases, the same percentage may be used to set $OSA_P$ (i.e., as a percentage of $I_P$) and $OSA_N$ (i.e., as a percentage of $I_N$), and the same or a different percentage may be used to set $T_{OPD}$ (i.e., as a percentage of $T_{PD}$) and $T_{OND}$ (i.e., as a percentage of $T_{ND}$). It should be noted that the various alternatives for setting the OS parameters and percentage values described above are exemplary only and not intended to be limiting.

Figure 5B:
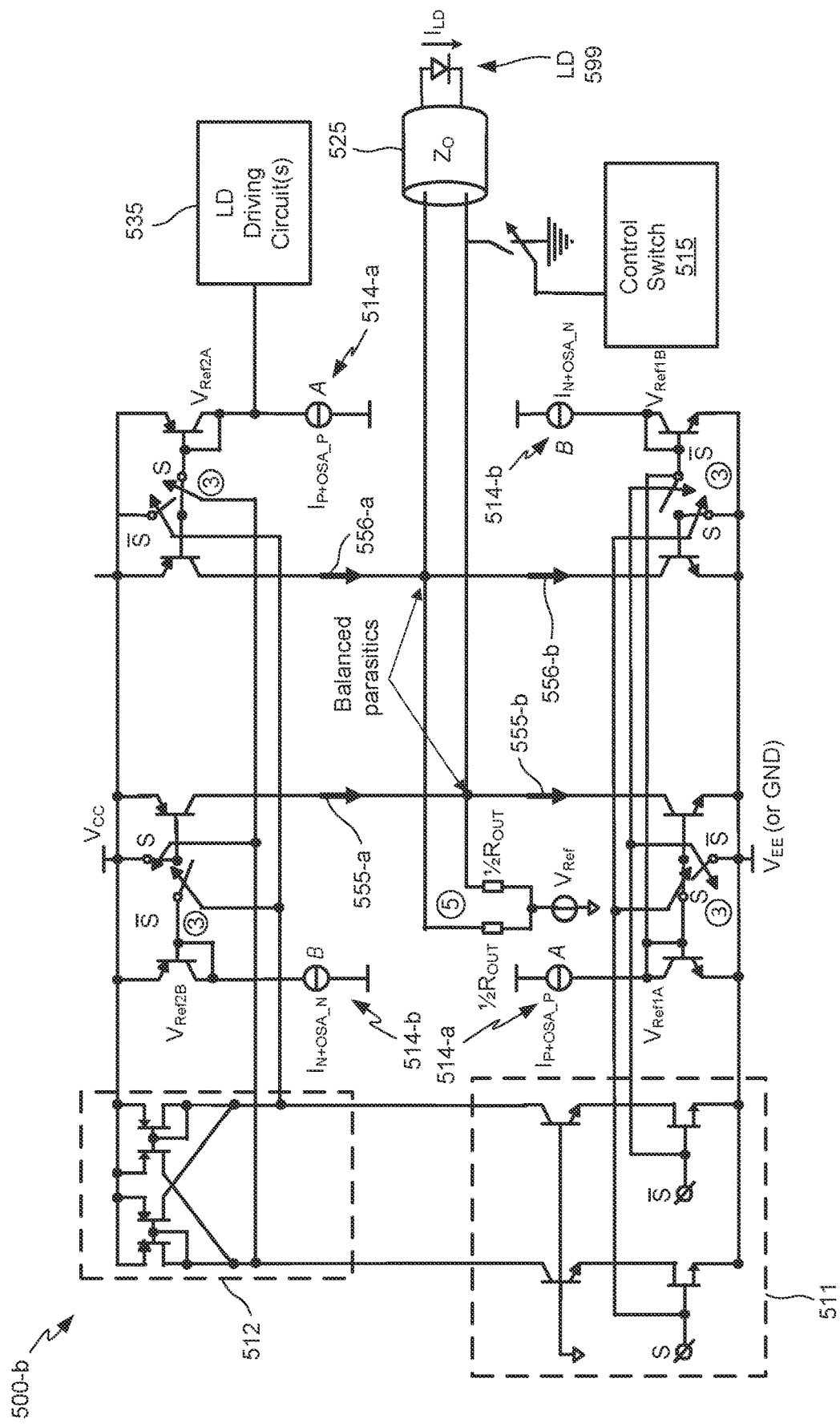
FIG. 5B illustrates an example schematic diagram of the LD driver in FIG. 5A, according to various aspects of the disclosure.

FIG. 5B illustrates an example schematic 500-b of an asymmetric LD driver utilizing a BiCMOS architecture, according to various aspects of the disclosure. In some instances, the asymmetric LD driver discussed in relation to FIG. 5B may be similar or substantially similar to the LD driver 115 in FIG. 1B and/or the asymmetric LD driver 501 in FIG. 5A.

As seen, the asymmetric LD driver comprises an input end 511 configured to receive information related to the one or more programmable features/parameters, including, but not limited to, $I_P$, $I_N$, $OSA_P$, $OSA_N$, $T_{PD}$, $T_{ND}$, $T_{OPD}$, and $T_{OND}$. The LD driver further comprises a level-shifter circuit 512, a plurality of switches (e.g., shown as switches 3 in FIG. 5B), and first and second current mirrors (e.g., shown as current mirror 514-a or current mirror A, current mirror 514-b or current mirror B). The LD driver 500-b may further include a programmable termination ($R_T$), shown as programmable termination 5 in FIG. 5B. In some cases, the LD driver may be electrically and/or communicatively coupled to existing LD driving circuit(s) 535 in the disk drive. Additionally, or alternatively, a controllable switch 515 may be provided to enable toggling between the DLH mode and the write mode. In some cases, write mode refers to the normal use of the laser diode to write data on the disk. When in write mode, the LD 599 may be driven using the LD driving circuit(s) 535. In some embodiments, the DLH mode utilizes high speed toggling to switch the positive and negative pulses at relatively high rates during pre-write mode conditions.

In this example, arrows 555-a, 555-b, 556-a, and 556-b indicate the current flow in the DLH mode. Specifically, but without limitation, arrows 555 and 556 indicate the current flow depending on the pulse state in the DLH mode. In some examples, only a pair of devices may be active to steer the current through the LD 599. For instance, if the pulse state is positive, the current, $I_{LD}$, flowing through the LD 599 may be positive and may be generated from currents 555-b and 556-a, in which case currents 555-a and 556-b are off. Similarly, if the pulse state is negative, the current, $I_{LD}$, flowing through the LD 599 may be negative and may be generated from currents 555-a and 556-b, in which case currents 555-b and 556-a are off. In one non-limiting example, if switch 515 is closed (i.e., to switch from DLH mode to write mode), currents 555-a, 555-b, and 556-b may be off, and the LD driving circuit 535 may use current 556-a to drive the LD 599.

Generally, the control circuitry 22 and/or the SoC 101 may be configured to control the DLH circuitry of the preamp for enabling/disabling DLH and set the DLH circuitry in calibration mode (e.g., reference signals, check calibration, set and/or store reference values). In such cases, the preamp circuitry may be configured for controlling one or more aspects of the current steering through the LD 599. For instance, the preamp circuitry may be configured to control the current ($I_{LD}$) through the LD 599 based on the preamp's register values, where the register values may be programmed by the control circuitry 22. Thus, in some aspects, the control circuitry 22 may indirectly control the $I_{LD}$ through the LD 599, based on setting the preamp's registers. In some embodiments, the control circuitry 22 and/or the SoC 101 may also be configured to control the mode (e.g., read or write mode) of the preamp.

It should be noted that the schematic depicted in FIG. 5B illustrates only one non-limiting example of an asymmetric LD driver and other applicable topologies are contemplated in different embodiments.

Figure 5C:
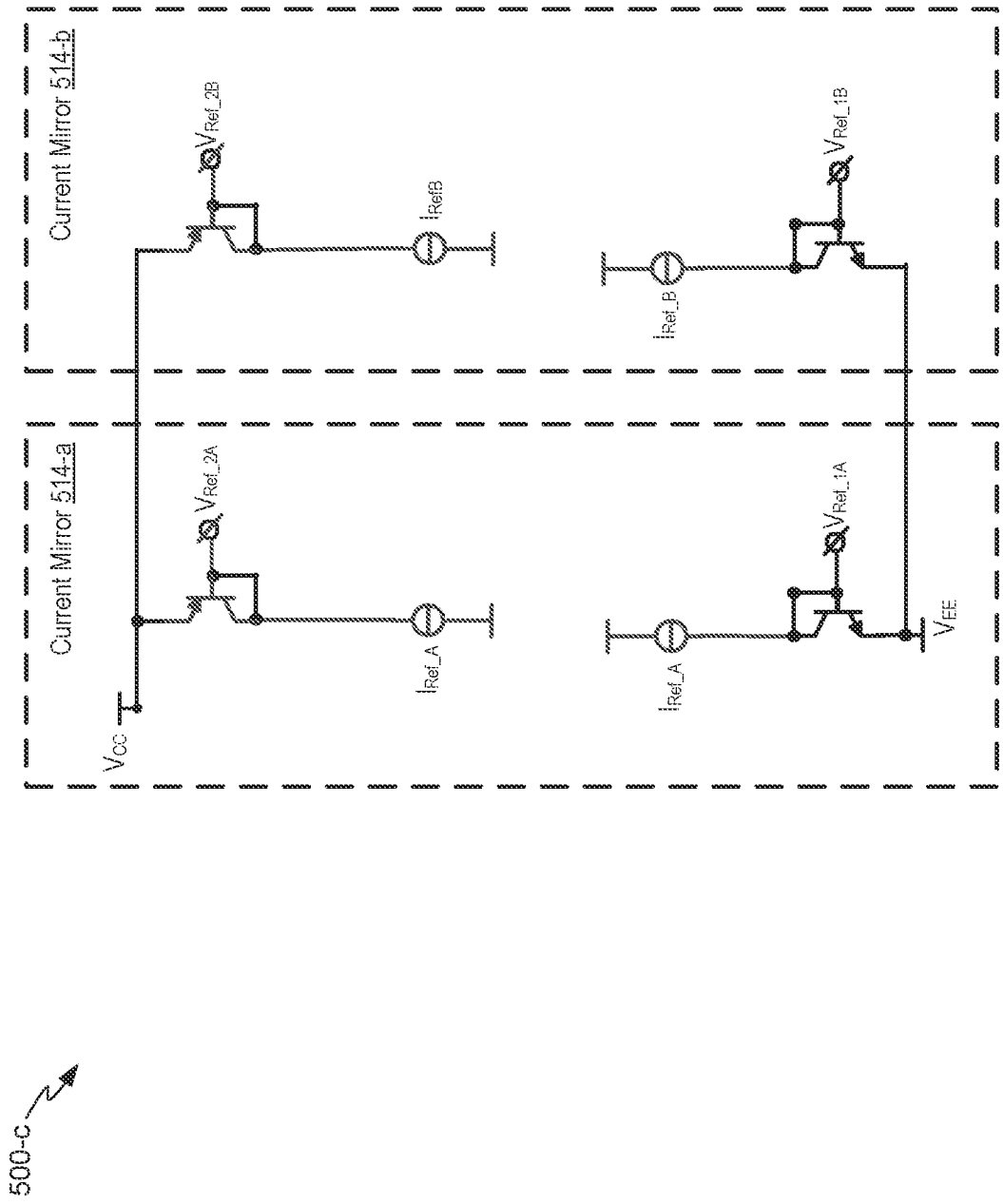
FIG. 5C illustrates an example schematic diagram of two current mirrors of the programmable asymmetric LD driver in FIGS. 5A and/or 5B, according to various aspects of the disclosure.

FIG. 5C illustrates an example schematic diagram 500-c of two current mirrors of an asymmetric LD driver (e.g., asymmetric LD driver in FIGS. 5A and/or 5B), according to various aspects of the disclosure. In this example, the current mirrors 514-a and 514-b may be similar or substantially similar to the ones described in relation to FIG. 5B.

In some embodiments, the current mirror 514-a (or alternatively, circuit group A) may be configured to control the write current ($I_W$) and the overshoot amplitude (OSA) for positive/rising transitions. For positive transitions, $I_W=I_P$ and OSA=$OSA_P$. Furthermore, the current mirror 514-b (or alternatively, circuit group B) may be configured to control the write current ($I_W$) and the OSA for negative/falling transitions. For negative transitions, $I_W=I_N$ and OSA=$OSA_N$. In some cases, one or more reference voltages (e.g., $V_{ref1A}$, $V_{ref1B}$, $V_{ref2A}$, $V_{ref2B}$) and one or more reference currents (e.g., $I_{refA}$, $I_{refB}$) may be utilized to control the waveform shape and/or other attributes of the output current waveform produced by the LD driver, further described below in relation to FIGS. 6A and 6B.

Figure 6A:
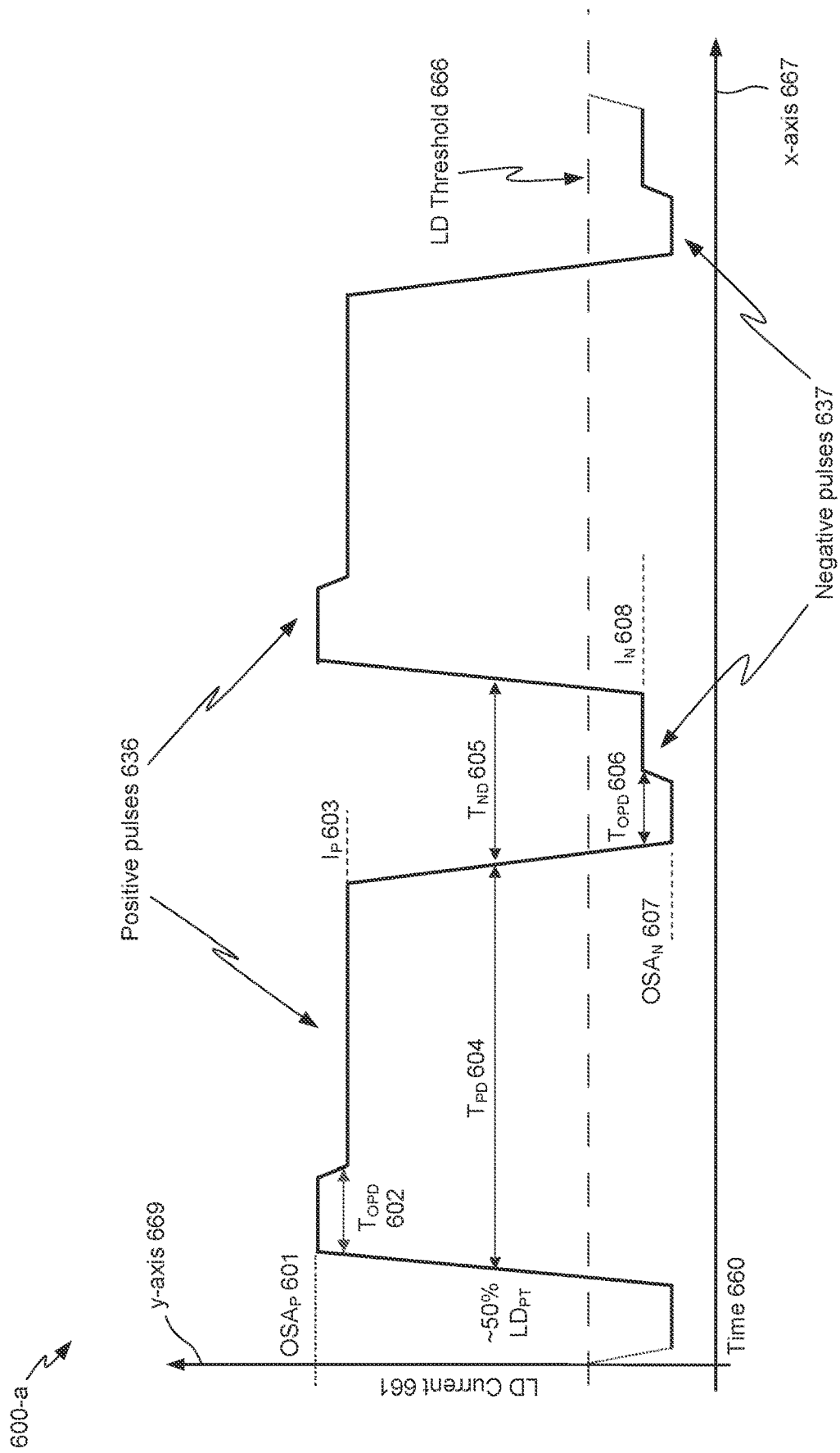
FIG. 6A illustrates a conceptual graph showing bias current pulses generated by a programmable LD driver and used to drive an LD of a data storage device, according to various aspects of the disclosure.

FIG. 6A illustrates a conceptual graph 600-a showing bias current pulses generated by a programmable LD driver (e.g., LD driver 500-b), where the bias current pulses are used to drive an LD of a data storage device, according to various aspects of the disclosure. Specifically, but without limitation, the graph 600-a depicts some examples of the signal levels and other parameters that can be controlled using the programmable asymmetric LD driver of the present disclosure. Here, LD current 661 is shown along the vertical or y-axis 669 and time 660 is shown along the horizontal or x-axis 667. FIG. 6A also depicts the LD threshold 666, which corresponds to the lasing threshold current or the current at which the LD starts lasing (i.e., producing an optical output). In some cases, the current applied to the LD needs to be at or above the lasing threshold current 666 for a threshold duration (i.e., turn-on delay) before it starts producing an optical output. It should be noted that the use of the term "negative pulse" need not imply that the corresponding voltage bias is under 0 volts (i.e., a negative or reverse bias voltage). In some cases, a negative pulse may correspond to a current bias level that is below (i.e., negative with respect to) the LD threshold 666. For example, if the LD threshold current is 50 mA, the negative pulses 637 may correspond to a current bias level that is below 50 mA, while the positive pulses 636 may correspond to a current bias level that is above 50 mA.

In this example, the current waveform output produced by the LD driver comprises a plurality of positive pulses 636 interspersed with a plurality of negative pulses 637, such that each positive pulse 636 is adjacent two negative pulses 637 and vice-versa. In some cases, one or more attributes/parameters of the positive pulses 636 and negative pulses 637 may be programmable. For example, the controllable attributes/parameters may include the peak positive laser current $I_P$ 603 (i.e., laser current above LD threshold 666), peak negative laser current $I_N$ 608 (i.e., laser current below LD threshold 666), positive duration $T_{PD}$ 604 (i.e., duration for which the laser current is >50% of LD power threshold or $LD_{PT}$), negative duration $T_{ND}$ 605 (i.e., duration for which the laser current is below LD threshold 666). In some cases, the controllable attributes/parameters may further include one or more overshoot specific parameters, such as, but not limited to, positive overshoot amplitude $OSA_P$ 601, negative overshoot amplitude $OSA_N$ 607, positive overshoot duration $T_{OPD}$ 602, and/or negative overshoot duration $T_{OPD}$ 606. In some examples, one or more of $T_{OPD}$ 602, $T_{PD}$ 604, $T_{ND}$ 605, and/or $T_{OPD}$ 606 may also be referred to as timing parameters.

In some embodiments, the asymmetric LD driver (e.g., LD driver 115, LD driver 501, LD driver 500-b) may be driven by positive current pulses 636 and negative current pulses 637, where the amplitude of the positive current pulses 636 may be greater or larger than the amplitude of the negative current pulses 637. In other words, $I_P$ 603>$I_N$ 608, as depicted in FIG. 6A. In some embodiments, the sum of $I_P$ 603 and $OSA_P$ 601 may also be greater in magnitude than the sum of $I_N$ 608 and $OSA_N$ 607. That is, $I_P$ 603+$OSA_P$ 601>$I_N$ 608+$OSA_N$ 607.

In some examples, the LD driver 115 (also shown as LD driver 501 in FIG. 5A, LD driver 500-b in FIG. 5B) in the AE or preamp IC may be used to drive the LD 599 as aligned to the timing of FIG. 6A.

Figure 6B:
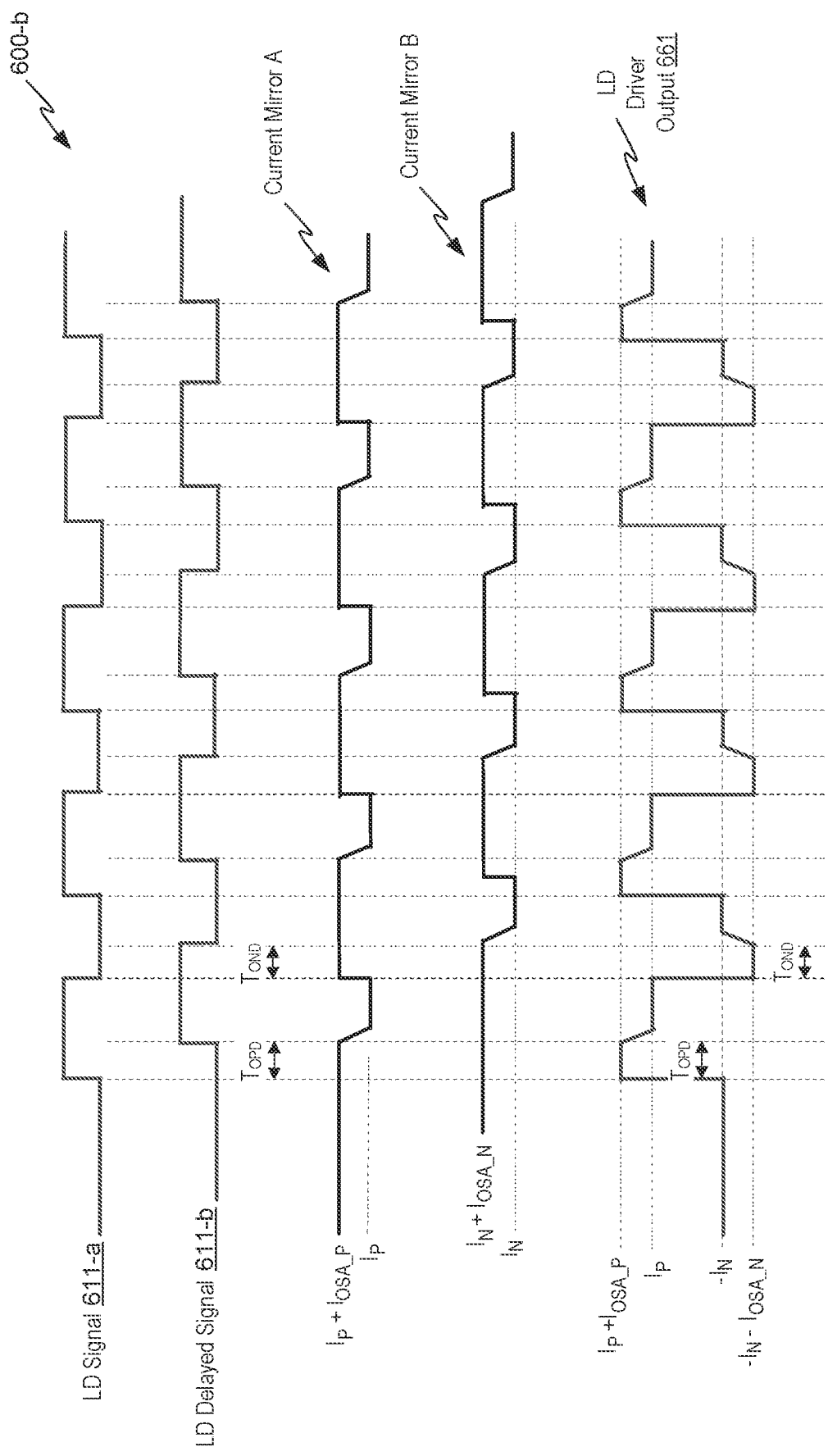
FIG. 6B illustrates example waveforms used to generate an output signal of a LD driver, as well as an example output waveform of the LD driver, according to various aspects of the disclosure.

FIG. 6B illustrates example waveforms 600-b used to generate an output signal of a LD driver, as well as an example output waveform 661 of the LD driver, according to various aspects of the disclosure. As noted above, in some cases, the current mirrors (e.g., first current mirror 514-a, second current mirror 514-b) may be used to control the OSA for positive/rising transitions and the OSA for negative/falling transitions. For example, the first current mirror may be used to control the OSA for positive/rising transitions, while the second current mirror may be used to control the OSA for negative/falling transitions. In some cases, the OSA durations (e.g., $T_{OPD}$, $T_{OND}$) may be controlled by controlling a delay between the positive/rising edges of a first PWM signal 611-a and a second PWM signal 611-b and controlling a delay between the negative/falling edges of the first and second PWM signals 611-a, 611-b. For instance, FIG. 6B depicts the delay between the rising edges of the PWM signals 611-a, 611-b as the overshoot positive duration ($T_{OPD}$) and the delay between the falling edges of the PWM signals 611-a, 611-b as the overshoot negative duration ($T_{OND}$). FIG. 6B also shows the current waveform (e.g., controlled using current mirror 514-a) corresponding to the LD bias current above the lasing threshold and the current waveform (e.g., controlled using current mirror 514-b) corresponding to the LD bias current below the lasing threshold.

In accordance with aspects of the disclosure, the handoffs between the first and the second current mirrors may be controlled such that the two current mirrors are used to contribute to the LD driver output 661 in an alternating fashion. For example, when the current mirror A is active and the second current mirror B is inactive, the LD driver output 661 is above the lasing threshold. Similarly, when the current mirror B is active and the current mirror A is inactive, the LD driver output 661 is below the lasing threshold current. In some embodiments, the programmable delay between signals 611-a and 611-b is used to control when the LD driver output 661 transitions from $I_P+I_{OSA\_P}$ to $I_P$ and from $-I_N-I_{OSA\_N}$ to $-I_N$, as shown in FIG. 6B. It should be noted that the waveform 661 corresponds to the LD driver output when in DLH mode, where there is high speed toggling of the laser current (e.g., between positive laser current and negative laser current). In some cases, the control circuitry 22 is configured to control the toggling between the DLH mode and the write mode. For instance, the control circuitry 22 may output control signal(s) to enable the DLH mode, disable the DLH mode, enable the write mode, disable the write mode, trigger ON/OFF based on the write control signal, etc. Such a design allows for a DLH non-write mode and a write non-DLH mode. In other words, there is no data being written on the disk when in DLH mode. Similarly, when in write mode, DLH is disabled, and normal laser diode bias is in operation to write data on the disk.

Figure 7:
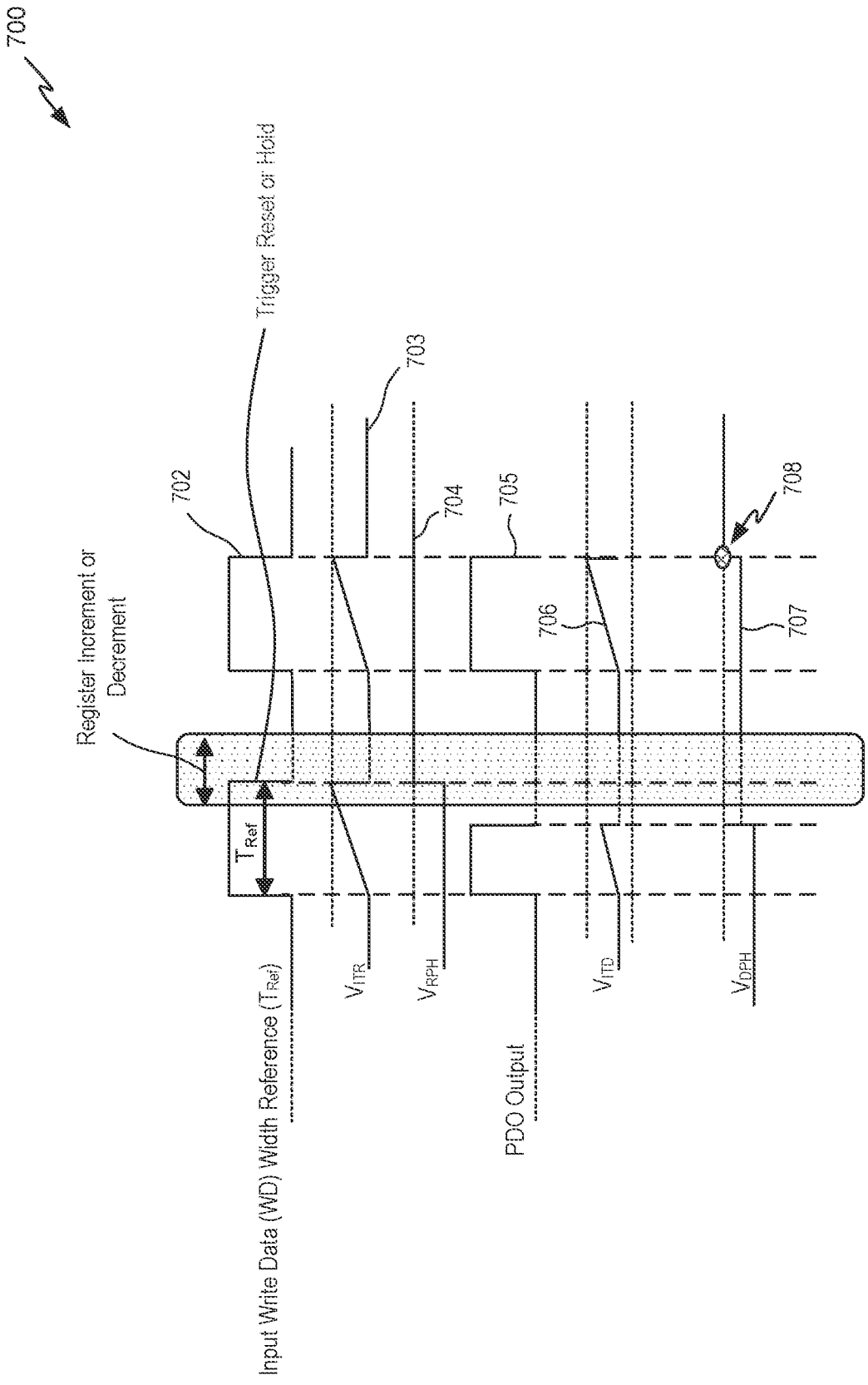
FIG. 7 illustrates example waveforms used for external reference timing (ERT) calibration of an asymmetric LD driver, according to various aspects of the disclosure.
Figure 8:
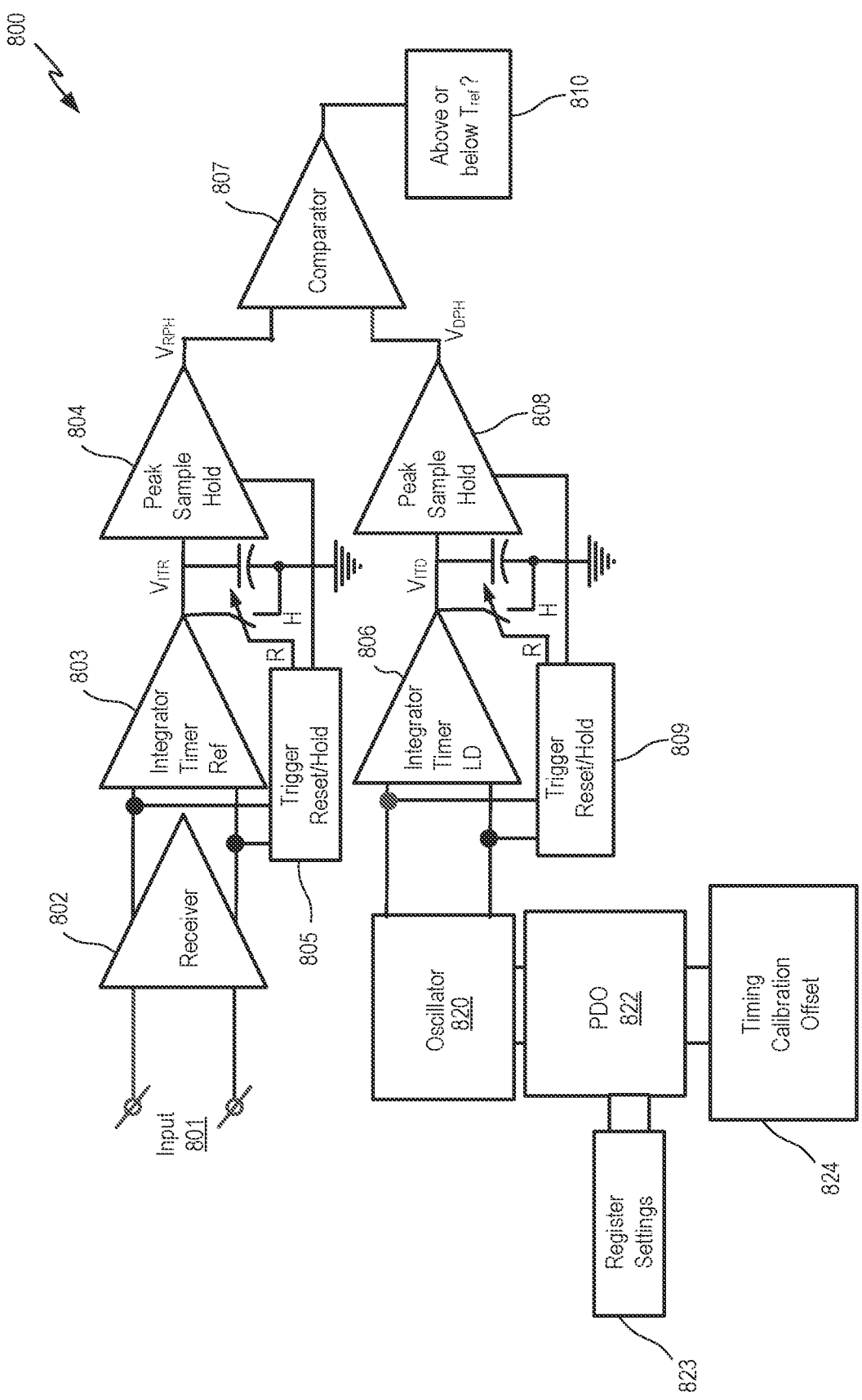
FIG. 8 illustrates a schematic diagram of circuitry that can be utilized for ERT calibration in a data storage device, according to various aspects of the disclosure.

Turning now to FIG. 8, which illustrates a schematic diagram 800 of circuitry that can be utilized for external reference timing (ERT) calibration in a HAMR drive, according to various aspects of the disclosure. FIG. 7 illustrates example waveforms 700 associated with ERT calibration in a HAMR drive, according to various aspects of the disclosure.

As seen in FIG. 8, the circuitry may include a clock signal input 801, a WD receiver 802, a reference integrator timer 803, a trigger reset/hold 805, a peak sample hold 804, a comparator 807, a peak sample hold 808, an integrator timer 806 for the LD, a trigger reset/hold 809, an oscillator 820, and a programmable duty cycle oscillator (PDO) 822. In some cases, the oscillator 820 determines the pulse width and/or frequency in DLH mode. Furthermore, the duty cycle of the oscillator 820 may need to be calibrated to produce relatively accurate (e.g., within 1%) pulse width values. In some cases, the PDO 822 is configured to receive information related to one or more of register settings 823 and timing calibration offset values 824. Furthermore, in some embodiments, an external reference clock may be used to input a timing signal to facilitate the calibration of the PDO 822.

In some cases, ERT calibration may involve receiving, at the clock signal input 801, a width reference ($T_{REF}$) from an external source. The reference integrator timer 803 then maps the width reference ($T_{REF}$) to a reference voltage ($V_{REF}$). The reference integrator timer 803 is configured to output an integrator voltage level ($V_{ITR}$), where $V_{ITR}$ is based on the trigger reset/hold 805 and the reference voltage ($V_{REF}$). The peak sample hold circuit 804 is utilized to hold the peak time-voltage level as $V_{RPH}$. In some cases, a comparator 807 is used to compare the reference peak hold voltage ($V_{RPH}$) to a delay peak hold voltage ($V_{DPH}$) and determine if the time/duration corresponding to the voltage level $V_{DPH}$ is above or below $T_{REF}$ (810). Specifically, the comparator 807 is used to compare the external reference signal (e.g., $V_{RPH}$) to the internal signal ($V_{DPH}$), where $V_{DPH}$ is derived from performing a peak-sample-hold (808) on the voltage ($V_{ITD}$) output by the integrator timer 806 for the LD. When $V_{DPH}$ is below $V_{RPH}$, the PDO output width may be too small and may need to adjusted higher. In other words, when $V_{DPH}$ is below $V_{RPH}$, the time/duration corresponding to $V_{DPH}$ is below $T_{REF}$.

In some cases, when $V_{DPH}$ is above $V_{RFH}$, the target pulse width, $T_{REF}$, is achieved. In such cases, this peak-sample-hold voltage $V_{DPH}$ is held once the timing period associated with $V_{DPH}$ is above $T_{REF}$. In some cases, the $T_{REF}$ is used to set one or more of $T_{PD}$, $T_{ND}$, $T_{OPD}$, and $T_{OND}$. For example, the PDO 822 may be used to calibrate one or more of the laser diode positive duration ($T_{PD}$) and the laser diode negative duration ($T_{ND}$), based on the $T_{REF}$, register settings 823, and the timing calibration offset 824.

In some cases, ERT calibration may further include scanning the timing calibration offset 824 values to the desired target (e.g., $T_{REF}$, where $T_{REF}$ may be 1 ns, 5 ns, 10 ns, etc.). Furthermore, ERT calibration may include storing and/or e-fusing the timing calibration offset values. For instance, once an optimum $T_{REF}$ is determined, the $T_{REF}$ value may be stored in memory on the disk drive controller (e.g., control circuitry 22) and/or stored on the AE 102 using e-fuse memory.

FIG. 7 depicts example waveforms associated with the external signals, including the input WD width reference $T_{REF}$ (702), the voltage $V_{ITR}$ output by the reference integrator timer (703), and the reference peak hold voltage $V_{RPH}$ (704). FIG. 7 also shows example waveforms associated with the internal signals, including the PDO output (705), the voltage VID output by the integrator timer for the LD (706), the peak-sample-hold voltage $V_{DPH}$ (707), and the peak voltage (708) that is held once the timing period associated with $V_{DPH}$ is above $T_{REF}$.

FIG. 9A illustrates a schematic diagram of a PDO 900-a that can be used in conjunction with an asymmetric LD driver for generating positive and negative portions of a duty cycle, according to various aspects of the disclosure. In this example, the PDO is an example of a ring-type oscillator that can be configured to program the positive (e.g., $T_{PD}$) and/or negative ($T_{ND}$) portions of the duty cycle of the LD bias waveform.

As shown in FIG. 9A, the PDO 900-a comprises a $T_{PD}$ register adjustment 901, a $T_{ND}$ register adjustment 904, a plurality of switches 903 and 907, a plurality of comparators 906 and 908, and at least one inverter 909. The comparators 906 and 908 may also receive a reference voltage input ($V_{REF}$), where $V_{REF}$ may be based at least in part on the width reference ($T_{REF}$), previously described in relation to FIGS. 7 and 8.

Figure 9C:
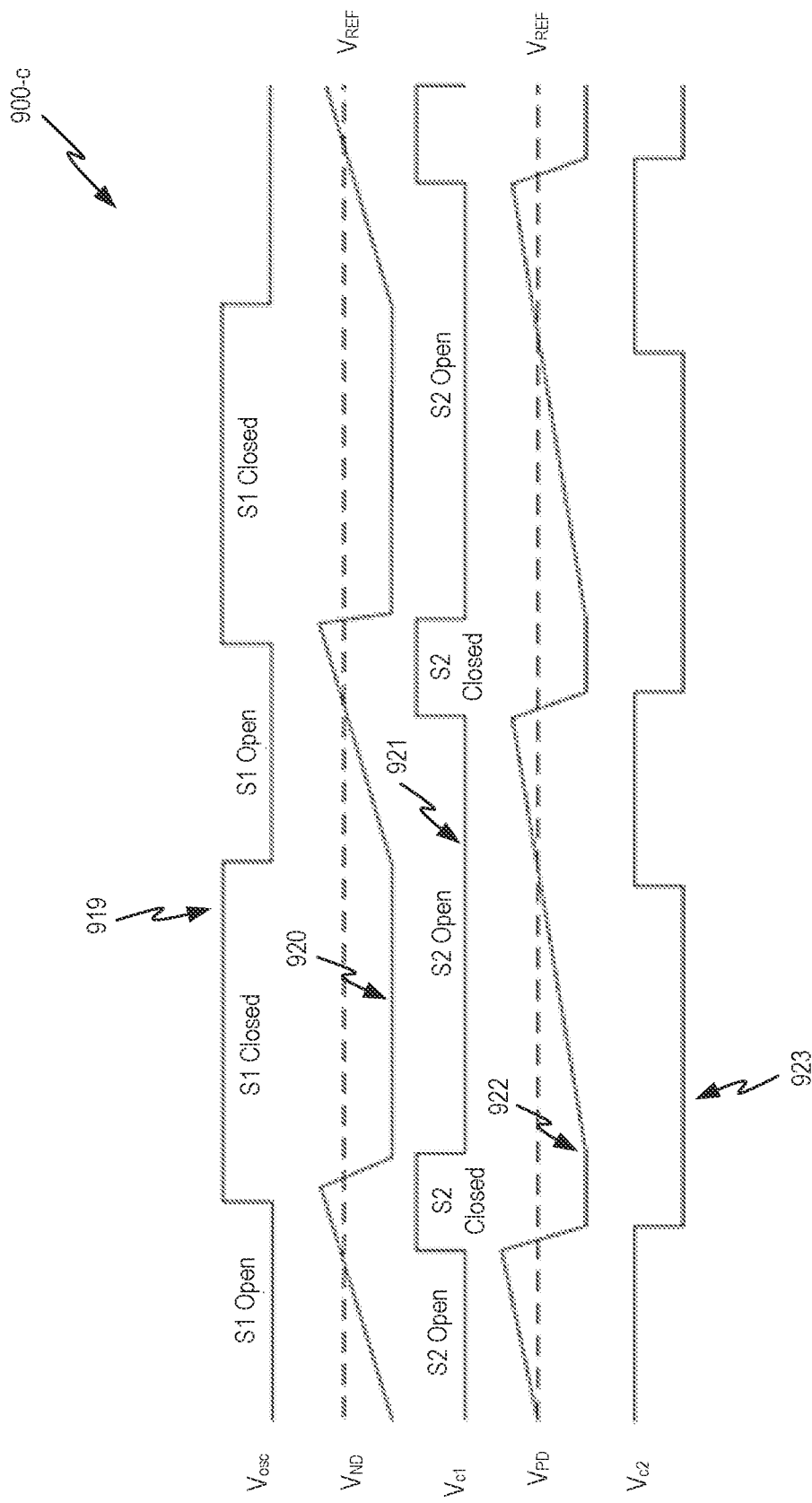
FIG. 9C illustrates a timing diagram showing the various voltages associated with the PDO in FIG. 9A, according to various aspects of the disclosure.

FIG. 9C illustrates a timing diagram 900-c showing the various voltages associated with the PDO 900-a, according to various aspects of the disclosure. As seen, the timing diagram 900-c shows $V_{OSC}$ 919 (oscillator voltage), VND 920, $V_{c1}$ 921 (output voltage of comparator 906), $V_{PD}$ 922, and $V_{c2}$ (output voltage of comparator 908). In this example, switch S1 corresponds to the switch 903 in FIG. 9A, while switch S2 corresponds to the switch 907 in FIG. 9A. In some examples, $T_{PD}$ register adjustment 901 may allow adjustment of the ramp rate of the VND 920 voltage, while $T_{ND}$ register adjustment 904 may allow adjustment of the ramp rate of the $V_{PD}$ 922 voltage.

FIG. 9B illustrates a conceptual graph 900-b showing the positive and negative portions of the duty cycle generated using the PDO in FIG. 9A, according to various aspects of the disclosure. Here, amplitude 998 is shown along the vertical or y-axis 990 and time 999 is shown along the horizontal or x-axis 991. The amplitude 998 may correspond to the amplitude of the LD bias current, or alternatively, the amplitude of the LD driver output. As seen, the positive portion of the duty cycle has a duration $T_{PD}$ and the negative portion of the duty cycle has a duration $T_{ND}$, where $T_{PD} > T_{ND}$. In this case, $T_{PD}$ corresponds to the duration during which the LD driver output (or alternatively, the LD bias current) is at least 50% of the peak amplitude. Similarly, $T_{ND}$ corresponds to the duration during which the LD driver output (or alternatively, the LD bias current) is less than 50% of the peak amplitude.

Thus, as described above, the present disclosure relates to an asymmetric bias LD driver with balanced parasitics that enables implementation of a high-speed positive laser bias architecture for DLH in a HAMR drive. Such a design enables "dark" laser heating of the laser diode to a target or steady state temperature associated with a write operation. This helps avoid or mitigate against mode-hop lasing effects, which serves to optimize HAMR drive performance, as compared to the prior art. In some cases, the asymmetric LD driver architecture can be implemented as an add-on feature to existing LD driving circuits utilized in HAMR drives. The present disclosure also supports the use of one or more programmable features/parameters, including, but not limited to, one or more amplitude parameters (e.g., $I_P$, $I_N$, $OSA_P$, $OSA_N$), one or more timing parameters (e.g., $T_{PD}$, $T_{ND}$, $T_{OPD}$, $T_{OND}$), and one or more termination parameters (e.g., programmable termination $R_T$). In some embodiments, an onboard oscillator (e.g., PDO 900-a) can be provided, for instance, to program the bias periods or duty cycle of the LD driver output.

Any suitable control circuitry (e.g., control circuitry 22 in FIG. 2A) may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or SoC (e.g., SoC 101 in FIG. 1B). In addition, control circuitry 22 may include a preamp circuit implemented as a separate integrated circuit, integrated into the read channel or data storage controller circuit, or integrated into the SoC.

In some examples, the control circuitry, such as, but not limited to, control circuitry 22, comprises a microprocessor executing instructions, the instructions being operable to cause the microprocessor to perform the flow diagrams (e.g., method 80 shown in FIG. 2C; method 90 shown in FIG. 2D) described herein. The instructions may be stored in any computer-readable medium. In some examples, they may be stored on a non-volatile semiconductor memory device, component, or system external to the microprocessor, or integrated with the microprocessor in the SoC 101. In some examples, the instructions are stored on the disk and read into a volatile semiconductor memory when the disk drive is powered on. In some examples, the control circuitry 22 comprises suitable logic circuitry, such as state machine circuitry. In some examples, at least some of the flow diagram blocks (e.g., method(s) 80 and/or 90) may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute control circuitry 22 as described herein and may perform one or more of the functions of control circuitry 22 as described herein. In various examples, control circuitry 22, or another processing device performing one or more of the functions of control circuitry as described herein, may be abstracted away from being physically proximate to the disks and disk surfaces. The control circuitry, or another processing device performing one or more of the functions of control circuitry as described herein, may be part of or proximate to a rack of or a unitary product comprising multiple data storage devices, may be part of or proximate to one or more physical or virtual servers, may be part of or proximate to one or more local area networks or one or more storage area networks, may be part of or proximate to a data center, or may be hosted in one or more cloud services.

In various examples, a disk drive, such as disk drive 15, may include a magnetic disk drive, an optical disk drive, a hybrid disk drive, or other types of disk drives. In addition, some examples may include electronic devices such as computing devices, data server devices, media content storage devices, or other devices, components, or systems that may comprise the storage media and/or control circuitry described above.

The various features and processes described above may be used independently of one another or may be combined in various ways. All possible combinations and subcombinations are intended to fall within the scope of this disclosure. In addition, certain method, event or process blocks may be omitted in some implementations. The methods and processes described herein are not limited to any particular sequence, and the blocks or states relating thereto can be performed in other sequences. For example, tasks or events may be performed in an order other than that specifically disclosed, or multiple tasks or events may be combined in a single block or state. The tasks or events may be performed in serial, in parallel, or in another manner. Tasks or events may be added to or removed from the disclosed examples. The systems and components described herein may be configured differently than described. For example, elements may be added to, removed from, or rearranged compared to the disclosed examples.

While certain embodiments are described herein, these embodiments are presented by way of example only, and do not limit the scope of this disclosure. Nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of this disclosure.

Method(s) 80 and/or 90 and other methods of this disclosure may include other steps or variations in various other embodiments. Some or all of method(s) 80 and/or 90 may be performed by or embodied in hardware, or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for a positive laser bias electrical control architecture for dark laser heating (DLH).

Those of skill in the art will be well-equipped by this disclosure with an understanding and an informed reduction to practice of a wide panoply of further applications, architectures, techniques, and methods for a positive laser bias electrical control architecture for DLH, and other aspects of this disclosure encompassed by the present disclosure and by the claims set forth below.

As used herein, the recitation of "at least one of A, B and C" is intended to mean "either A, B, C or any combination of A, B and C." The disclosed examples are provided to enable any person skilled in the relevant fields of art to understand how to make or use the subject matter of this disclosure. Various modifications to these embodiments will be readily apparent to those skilled in the art based on this disclosure, and the generic principles defined herein may be applied to other examples without departing from the spirit or scope of this disclosure. Thus, this disclosure is not limited to the embodiments shown herein but is to be accorded the widest scope consistent with the principles and novel features disclosed herein.

This disclosure and many of its attendant advantages will be understood by the foregoing description, and various changes may be made in the form, construction, and arrangement of the components without departing from the disclosed subject matter or without sacrificing its material advantages. The form described is merely explanatory, and the following claims encompass and include a wide range of embodiments, including a wide range of changes in the form, construction, and arrangement of components as described herein.

While this disclosure has been described with reference to various examples, these examples are illustrative, and the scope of the disclosure is not so limited. The subject matter described herein is presented in the form of illustrative, non-limiting examples, and not as exclusive implementations, whether or not they are explicitly called out as examples as described. Many variations, modifications, and additions are possible within the scope of the examples of the disclosure. More generally, examples in accordance with this disclosure have been described in the context of particular implementations. Functionality may be separated or combined in blocks differently or described with different terminology, without departing from the spirit and scope of this disclosure and the following claims. These and other variations, modifications, additions, and improvements may fall within the scope of this disclosure as defined in the following claims.

The invention claimed is:

1. A data storage device comprising:
a disk;
a read/write head configured to read data from and write data to the disk;
a laser diode coupled to a near field transducer (NFT) configured to heat an area of the disk near the read/write head;
an asymmetric laser diode driver configured to drive the laser diode; and
one or more processing devices or components configured, individually or in combination, to:
preheat the laser diode to a target temperature, wherein the preheating comprises:
generating, based at least in part on the target temperature, at least one bias pulse conforming to a plurality of tunable parameters, the plurality of tunable parameters including one or more amplitude parameters, wherein the one or more amplitude parameters comprise one or more of: (1) a first laser diode bias current ($I_P$) greater than a lasing threshold current, (2) a second laser diode bias current ($I_N$) lower than the lasing threshold current, (3) a first duration ($T_{PD}$), and (4) a second duration ($T_{ND}$); and
applying, using the asymmetric laser diode driver, the at least one bias pulse to the laser diode such that no optical response is produced by the laser diode; and
initiate a write operation for writing data to the disk.

2. The data storage device of claim 1, wherein the plurality of tunable parameters further comprise one or more overshoot parameters, and wherein the one or more overshoot parameters comprise:
a first overshoot amplitude current ($OSA_P$), wherein $OSA_P$ corresponds to a positive overshoot compensation greater than $I_P$;
a first overshoot duration ($T_{OPD}$);
a second overshoot amplitude current ($OSA_N$), wherein $OSA_N$ corresponds to a negative overshoot compensation lower than $I_N$; and
a second overshoot duration ($T_{OND}$).

3. The data storage device of claim 2, wherein generating the at least one bias pulse comprises:
generating a plurality of current pulses, including at least:
a first current pulse spanning the first duration ($T_{PD}$), the first current pulse including a first overshoot portion spanning the first overshoot duration ($T_{OPD}$), wherein a corresponding bias current associated with the first current pulse is greater than the lasing threshold current; and
a second current pulse spanning the second duration ($T_{ND}$), the second current pulse including a second overshoot portion spanning the second overshoot duration ($T_{OND}$), wherein a corresponding bias current associated with the second current pulse is lower than the lasing threshold current.

4. The data storage device of claim 3, wherein:
$T_{PD}$ is shorter than a turn-on delay for the laser diode;
$T_{OPD}$ is shorter than $T_{PD}$;
$T_{OND}$ is shorter than $T_{ND}$; and
$T_{ND}$ is shorter than $T_{PD}$.

5. The data storage device of claim 1, wherein the asymmetric laser diode driver comprises an asymmetric Bipolar Complementary Metal-Oxide Semiconductor (BiCMOS) driver.

6. The data storage device of claim 5, wherein the asymmetric laser diode driver is driven by positive current pulses and negative current pulses, and wherein the positive current pulses have an amplitude that is greater in magnitude than an amplitude of the negative current pulses.

7. A data storage device comprising:
a disk;
a read/write head configured to read data from and write data to the disk;
a laser diode coupled to a near field transducer (NFT) configured to heat an area of the disk near the read/write head;
an asymmetric laser diode driver configured to drive the laser diode, wherein the asymmetric laser diode driver comprises:
a first current mirror for controlling at least an overshoot amplitude for positive or rising transitions of a positive bias current applied to the laser diode; and a second current mirror for controlling at least an overshoot amplitude for negative or falling transitions of a negative bias current applied to the laser diode; and one or more processing devices or components configured, individually or in combination, to:
preheat the laser diode to a target temperature, wherein the preheating comprises:
generating at least one bias pulse conforming to one or more tunable parameters, based at least in part on the target temperature; and
applying, using the asymmetric laser diode driver, the at least one bias pulse to the laser diode such that no optical response is produced by the laser diode; and
initiate a write operation for writing data to the disk.

8. The data storage device of claim 7, further comprising:
an oscillator coupled to the asymmetric laser diode driver, the oscillator configured to provide a first pulse width modulation (PWM) signal and a second PWM signal to the asymmetric laser diode driver;
wherein the one or more processing devices or components are further configured, individually or in combination, to:
identify a delay between the first and the second PWM signal;
receive, from the first current mirror, a first signal corresponding to a laser diode bias current above a lasing threshold current;
receive, from the second current mirror, a second signal corresponding to a laser diode bias current below the lasing threshold current; and
receive one or more external reference timing (ERT) signals for controlling a handoff between the asymmetric laser diode driver and the first and the second current mirrors.

9. The data storage device of claim 8, wherein:
identifying the one or more overshoot parameters further comprises determining a first overshoot duration ($T_{OPD}$) and a second overshoot duration ($T_{OND}$), based at least in part on the identified delay; and
generating the at least one bias pulse is further based at least in part on controlling the handoff.

10. The data storage device of claim 9, wherein the one or more processing devices or components are further configured, individually or in combination, to calibrate a positive portion of a duty cycle, and wherein calibrating the positive portion of the duty cycle comprises:
calibrating a first duration ($T_{PD}$) during which the laser diode bias current is greater than the lasing threshold current; and
calibrating the first overshoot duration ($T_{OPD}$) during which the laser diode bias current is greater than a positive peak laser current ($I_P$), and wherein the first duration ($T_{PD}$) is longer than or includes the first overshoot duration ($T_{OPD}$).

11. The data storage device of claim 10, wherein the peak laser current ($I_P$) is based at least in part on the target temperature, and wherein the target temperature corresponds to a steady-state temperature associated with the write operation.

12. The data storage device of claim 8, wherein the one or more ERT signals comprise a plurality of ERT signals, and wherein the plurality of ERT signals are used to calibrate at least a positive portion of a duty cycle and a negative portion of the duty cycle.

13. The data storage device of claim 12, wherein calibrating the negative portion of the duty cycle comprises:
calibrating a first duration ($T_{ND}$) during which the laser diode bias current is lower than the lasing threshold current, and
calibrating a first overshoot duration ($T_{OND}$) during which the laser diode bias current is lower than a negative peak laser current ($I_N$), and wherein the first duration ($T_{ND}$) is longer than or includes the first overshoot duration ($T_{OND}$).

14. A method for operating a data storage device configured for heat-assisted magnetic recording using a laser diode, the method comprising:
preheating the laser diode to a target temperature, wherein the preheating comprises:
generating, based at least in part on the target temperature, at least one bias pulse conforming to a plurality of parameters, the plurality of tunable parameters including one or more amplitude parameters, wherein the one or more amplitude parameters comprise one or more of: (1) a first laser diode bias current ($I_P$) greater than a lasing threshold current, (2) a second laser diode bias current ($I_N$) lower than the lasing threshold current, (3) a first duration ($T_{PD}$), and (4) a second duration ($T_{ND}$); and
applying, using an asymmetric laser diode driver, the at least one bias pulse to the laser diode such that no optical response is produced by the laser diode; and
initiating a write operation for writing data to a disk of the data storage device.

15. The method of claim 14, wherein the plurality of tunable parameters further include one or more overshoot parameters, and wherein the one or more overshoot parameters comprise:
a first overshoot amplitude current ($OSA_P$), wherein $OSA_P$ corresponds to a positive overshoot compensation above $I_P$;
a first overshoot duration ($T_{OPD}$), wherein $T_{OPD}$ is shorter than $T_{PD}$;
a second overshoot amplitude current ($OSA_N$), wherein $OSA_N$ corresponds to a negative overshoot compensation below $I_N$; and
a second overshoot duration ($T_{OND}$), wherein $T_{OND}$ is shorter than $T_{ND}$.

16. The method of claim 15, wherein generating the at least one bias pulse comprises:
generating a plurality of current pulses, including at least:
a first current pulse spanning the first duration ($T_{PD}$), the first current pulse including a first overshoot portion spanning the first overshoot duration ($T_{OPD}$), wherein a corresponding bias current associated with the first current pulse is above the lasing threshold current; and
a second current pulse spanning the second duration ($T_{ND}$), the second current pulse including a second overshoot portion spanning the second overshoot duration ($T_{OND}$), wherein a corresponding bias current associated with the second current pulse is below the lasing threshold current.

17. The method of claim 14, wherein the asymmetric laser diode driver comprises an asymmetric Bipolar Complementary Metal-Oxide Semiconductor (BiCMOS) driver.

18. The method of claim 17, wherein the asymmetric laser diode driver is driven by positive current pulses and negative current pulses, and wherein the positive current pulses have an amplitude that is greater in magnitude than an amplitude of the negative current pulses.

19. The method of claim 14, further comprising:
receiving a plurality of external reference timing (ERT) signals;
receiving a first pulse width modulation (PWM) signal and a second PWM signal;
identifying a delay between the first and the second PWM signal; and
identifying a plurality of overshoot parameters, and wherein identifying the one or more overshoot parameters further comprises determining a first overshoot duration ($T_{OPD}$) and a second overshoot duration ($T_{OND}$), based at least in part on the identified delay.

20. The method of claim 19, wherein generating the at least one bias pulse further comprises:
calibrating a first duration ($T_{PD}$) during which a laser diode bias current associated with the at least one bias pulse is above a lasing threshold current, based on at least one of the plurality of ERT signals;
calibrating the first overshoot duration ($T_{OPD}$) during which the laser diode bias current is above a first laser current ($I_P$);
calibrating a second duration ($T_{ND}$) during which the laser diode bias current is below the lasing threshold current, based on at least one of the plurality of ERT signals; and
calibrating the second overshoot duration ($T_{OND}$) during which the laser diode bias current is below a second laser current ($I_N$); and
wherein the lasing threshold current is lower than the first laser current ($I_P$) and greater than the second laser current ($I_N$).

21. One or processing devices comprising:
means for preheating a laser diode of a data storage device to a target temperature, wherein the data storage device is configured for heat-assisted magnetic recording using the laser diode, and wherein the means for preheating comprises:
means for generating, based at least in part on the target temperature, at least one bias pulse conforming to a plurality of tunable parameters, the plurality of tunable parameters including one or more amplitude parameters, wherein the one or more amplitude parameters comprise one or more of: (1) a first laser diode bias current ($I_P$) greater than a lasing threshold current, (2) a second laser diode bias current ($I_N$) lower than the lasing threshold current, (3) a first duration ($T_{PD}$), and (4) a second duration ($T_{ND}$); and
means for applying the at least one bias pulse to the laser diode such that no optical response is produced by the laser diode; and
means for initiating a write operation for writing data to a disk of the data storage device.

22. A data storage device comprising:
a disk;
a read/write head configured to read data from and write data to the disk;
a laser diode (LD) coupled to a near field transducer (NFT) configured to heat an area of the disk near the read/write head;
an asymmetric LD driver configured to drive the LD, wherein the asymmetric LD driver comprises an asymmetric Bipolar Complementary Metal-Oxide Semiconductor (BiCMOS) driver; and
one or more processing devices or components configured, individually or in combination, to:
preheat the laser diode to a target temperature, wherein the preheating comprises:
generating at least one bias pulse conforming to one or more tunable parameters, based at least in part on the target temperature; and
applying, using the asymmetric LD driver, the at least one bias pulse to the laser diode such that no optical response is produced by the laser diode; and
initiate a write operation for writing data to the disk.

* * * * *